Figure 1:
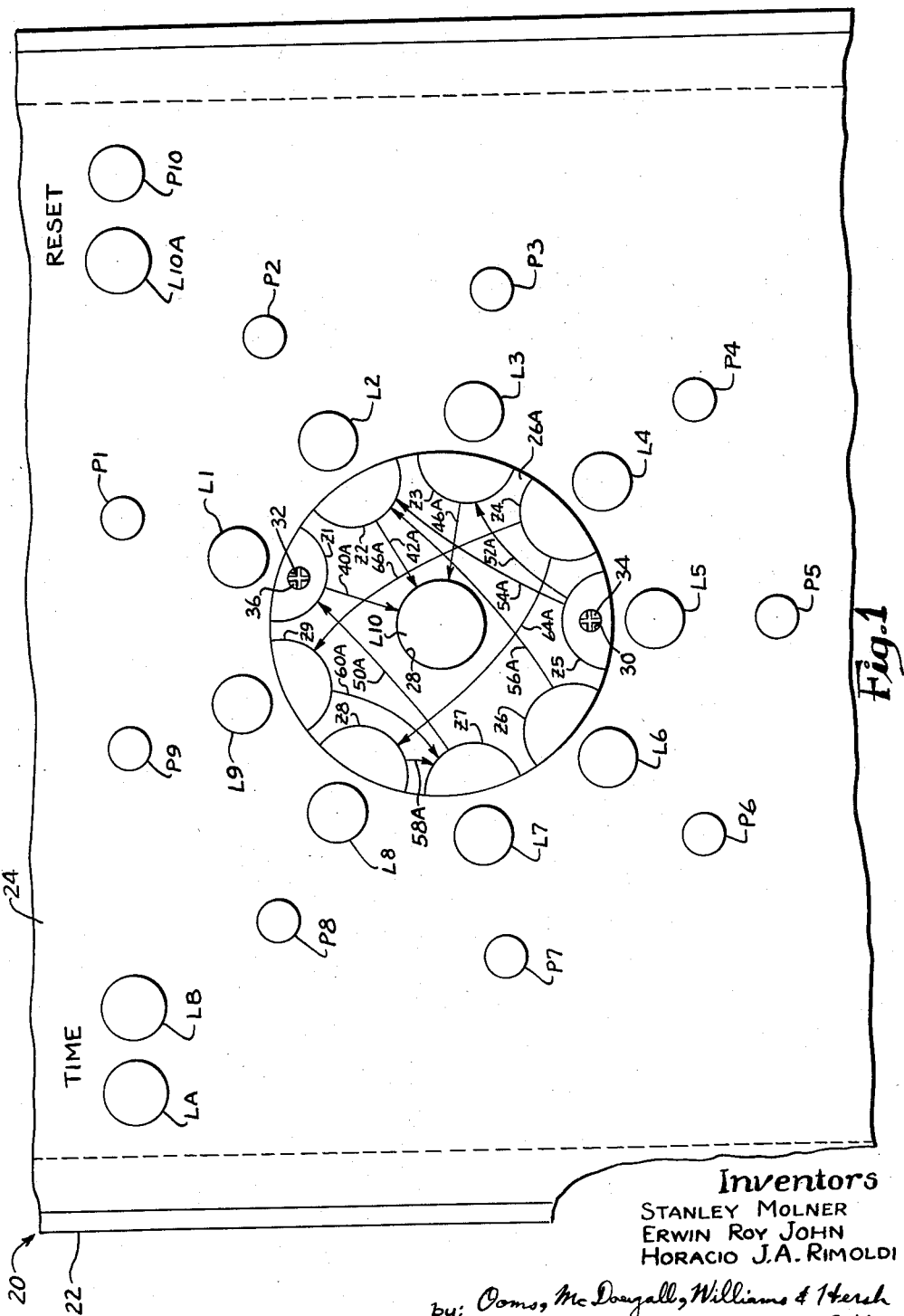

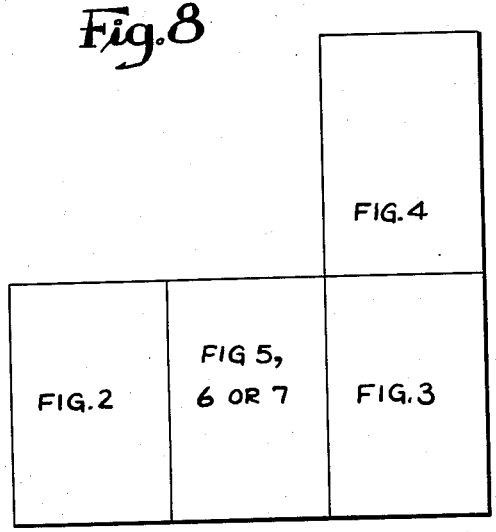
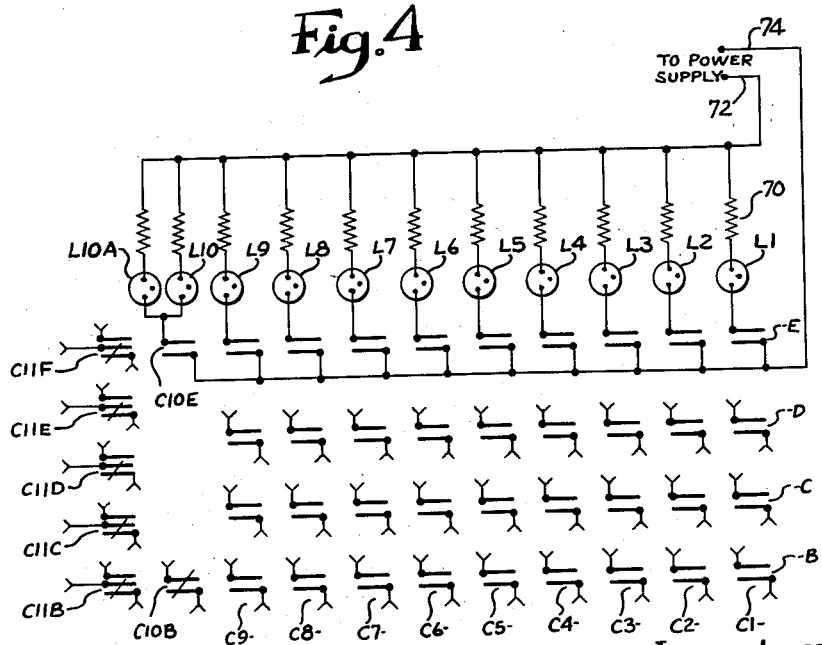

March 15, 1960 S. MOLNER ET AL 2,928,189
PSYCHOLOGICAL TESTING APPARATUS
Filed Aug. 16, 1956 11 Sheets-Sheet 5

Inventors
STANLEY MOLNER
ERWIN ROY JOHN
HORACIO J.A. RIMOLDI
by: Ooms, McDougall, Williams & Hersh
Attys.

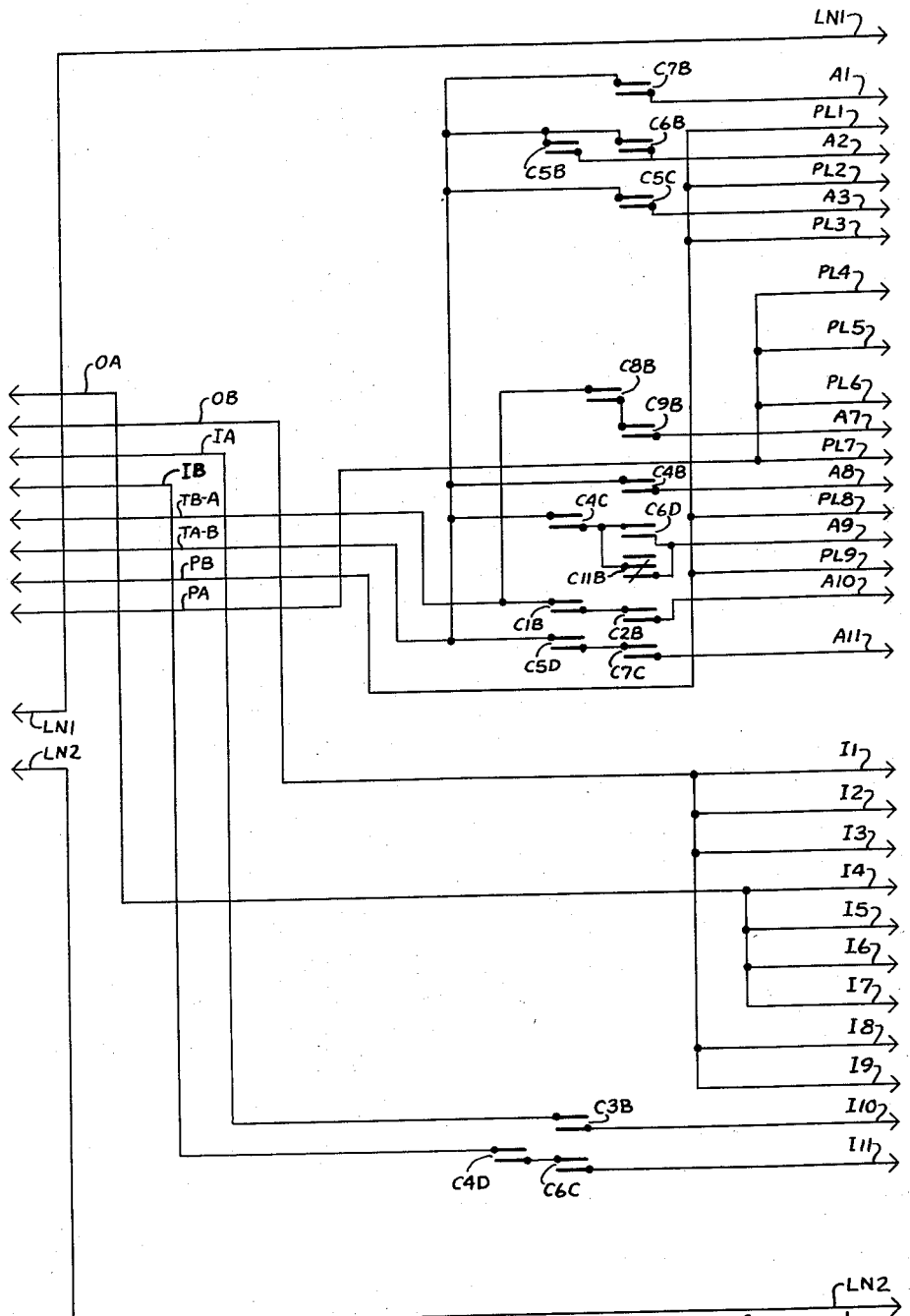

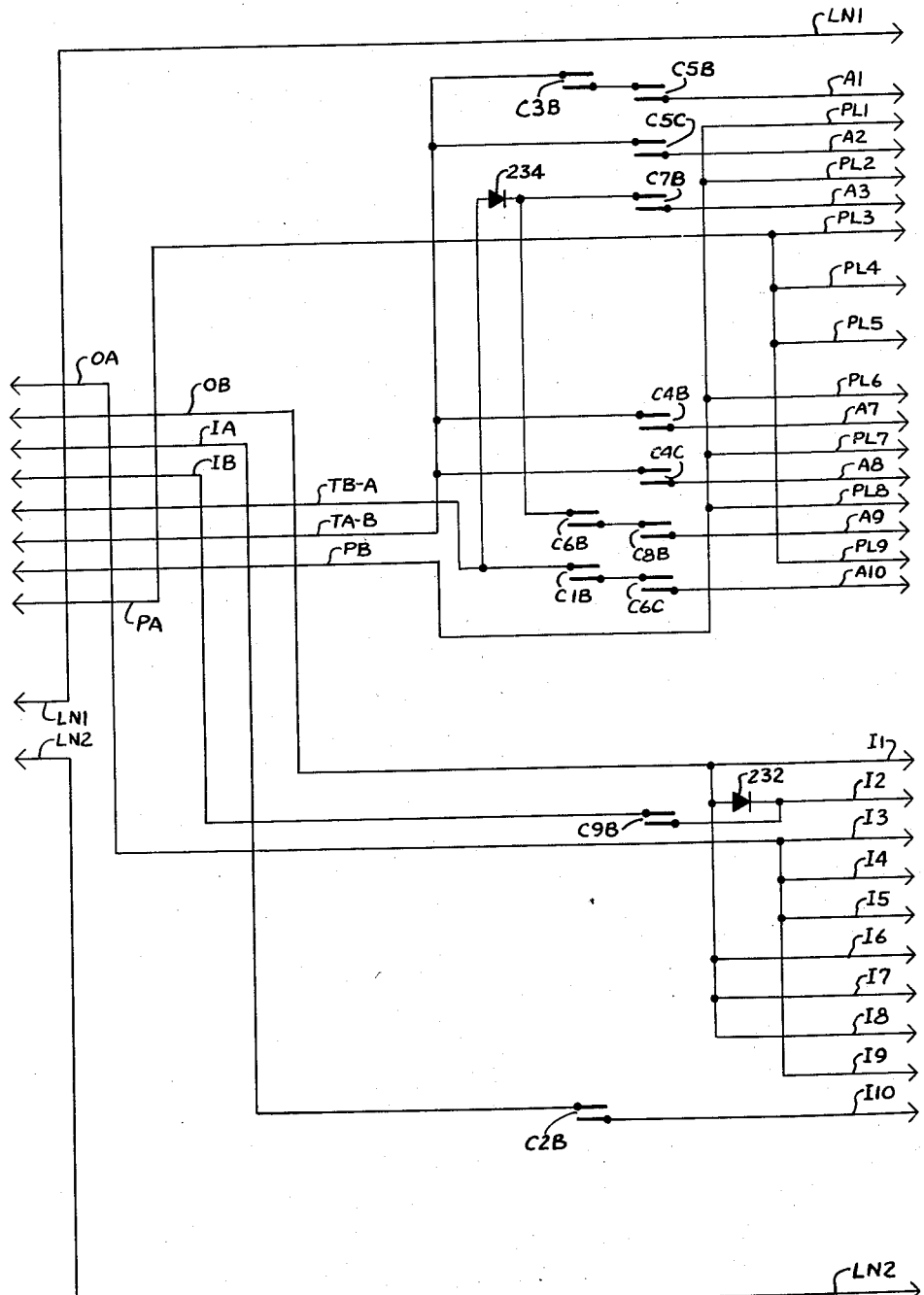

March 15, 1960  S. MOLNER ET AL  2,928,189
PSYCHOLOGICAL TESTING APPARATUS
Filed Aug. 16, 1956  11 Sheets-Sheet 8

Inventors
STANLEY MOLNER
ERWIN ROY JOHN
HORACIO J.A. RIMOLDI
by: Ooms, McDougall, Williams & Hersh
Attys.

Inventors
STANLEY MOLNER
ERWIN ROY JOHN
HORACIO J.A. RIMOLDI

March 15, 1960  S. MOLNER ET AL  2,928,189
PSYCHOLOGICAL TESTING APPARATUS
Filed Aug. 16, 1956  11 Sheets-Sheet 10

Inventors
STANLEY MOLNER
ERWIN ROY JOHN
HORACIO J.A. RIMOLDI by: Ooms, McDougall, Williams & Hersh
Attys.

United States Patent Office
2,928,189
Patented Mar. 15, 1960

2,928,189

PSYCHOLOGICAL TESTING APPARATUS

Stanley Molner, Chicago, Ill., Erwin Roy John, Los Angeles, Calif., and Horacio J. A. Rimoldi, Chicago, Ill.

Application August 16, 1956, Serial No. 604,557

19 Claims. (Cl. 35—22)

This invention relates to methods of and apparatus for use in psychological testing.

One object of the present invention is to provide a new and improved method and apparatus for testing the problem solving behavior of a subject person.

A further object is to provide such a new and improved method and apparatus for investigating not only the ability and facility of the subject to solve a problem, but also his behavior and technique in arriving at a solution.

Another object is to provide such a new and improved method and apparatus for testing the ability of the subject to obtain, understand, remember and utilize the causal relations involved in a problem involving a chain or network of causation.

It is a further object to provide such a new and improved method and apparatus that will provide problems having the logical and causal content of many real life problems, without necessarily having any fact content, with the result that the method and apparatus will test the problem solving ability and behavior of the subject in the abstract, without reference to any unusual facts that might be well-known to some subjects but unknown to others.

A further object is to provide a new and improved method and apparatus whereby the manner in which a subject solves a problem will be readily observable, so that the efficiency and logical perceptiveness of the subject in solving the problem may be measured.

It is a further object to provide a new and improved method and apparatus whereby the problem solving process utilized by a subject may be directly observed and analyzed.

A further object is to provide a new and improved method and apparatus that will test the problem solving behavior of a subject in the abstract, with a minimum of reference to and influence from any special skills, knowledge or experience possessed by the individual subject.

It is a further object to provide such a method and apparatus that will present problems having fact content, if desired.

It is another object to provide a new and improved method and apparatus whereby a great number of different problems, of the same difficulty or of graded difficulty, may be presented to a subject.

A further object is to provide a new and improved method and apparatus which presents the subject with a problem involving an ultimate event or result that is arrived at from one or more initial events, under the control of the subject, by way of a chain or network of causation involving one or more intermediate events which may also be directly initiated by the subject so that he may determine and utilize information with regard to the chain of causation, so as to solve the problem and bring about the ultimate event by a predetermined selection and sequential arrangement of the initial events.

It is a further object to provide a new and improved psychological testing apparatus involving one or more selectively operable input elements under the control of the subject, an output element and means establishing a predetermined chain or network of causal connections between the input and output elements so that the output element may be operated by unique manipulation of the input elements.

A further object is to provide a new and improved psychological testing apparatus having an output indicator that may be operated by unique manipulation of one or more input actuator elements, connected to the output indicator by a causal chain or network involving intermediate respondors which may be actuated directly by operation of intermediate actuators, so that the subject can obtain information as to the nature of the causal network, to assist him in determining the manner in which the output indicator may be operated by manipulation of the input actuators.

Further objects and advantages of the present invention will appear from the following description, taken with the accompanying drawings, in which:

Fig. 1 is a diagrammatic view of the control panel of a psychological testing device constituting an illustrative embodiment of the present invention.

Figure 2:
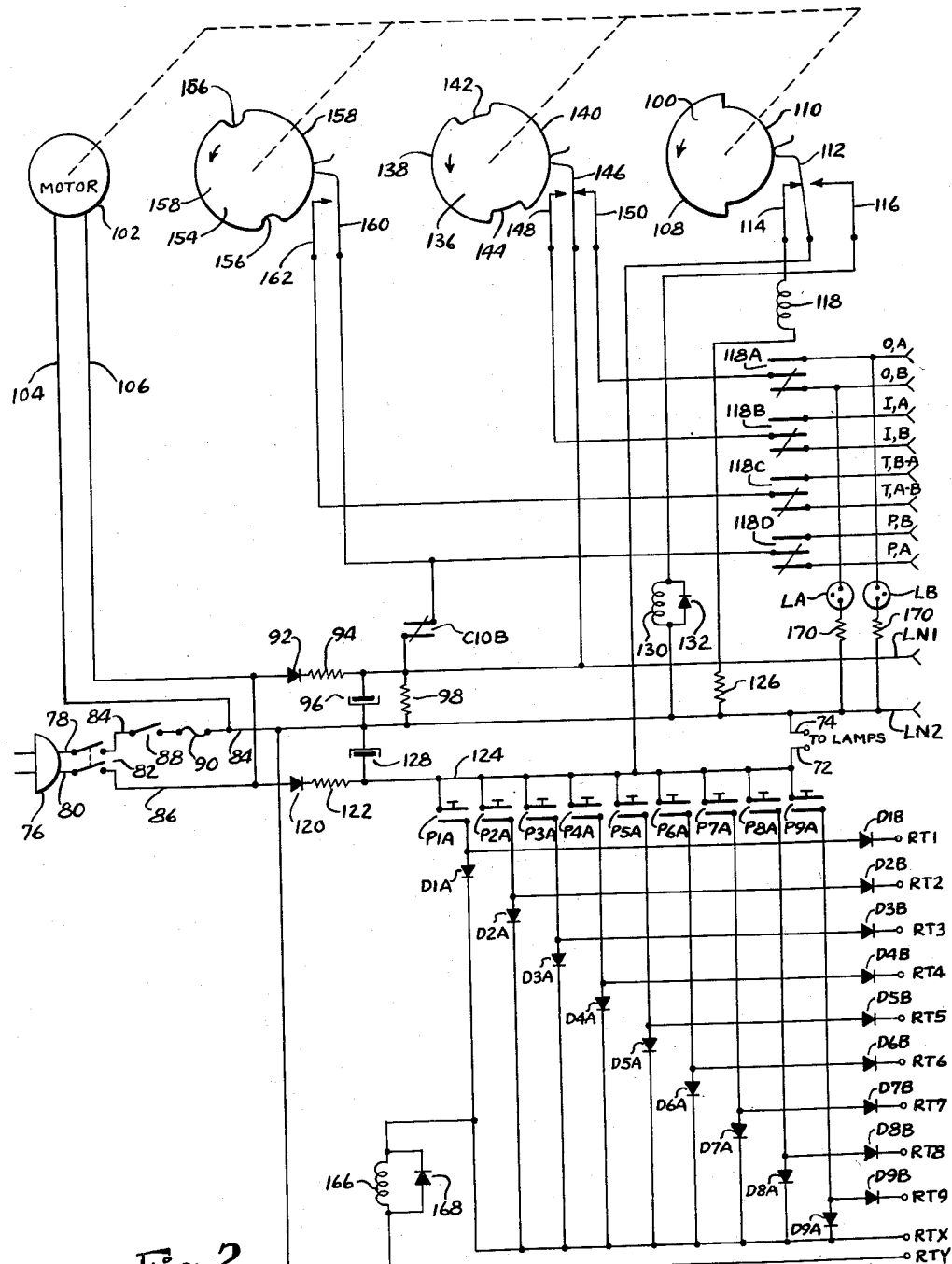
Figure 3:
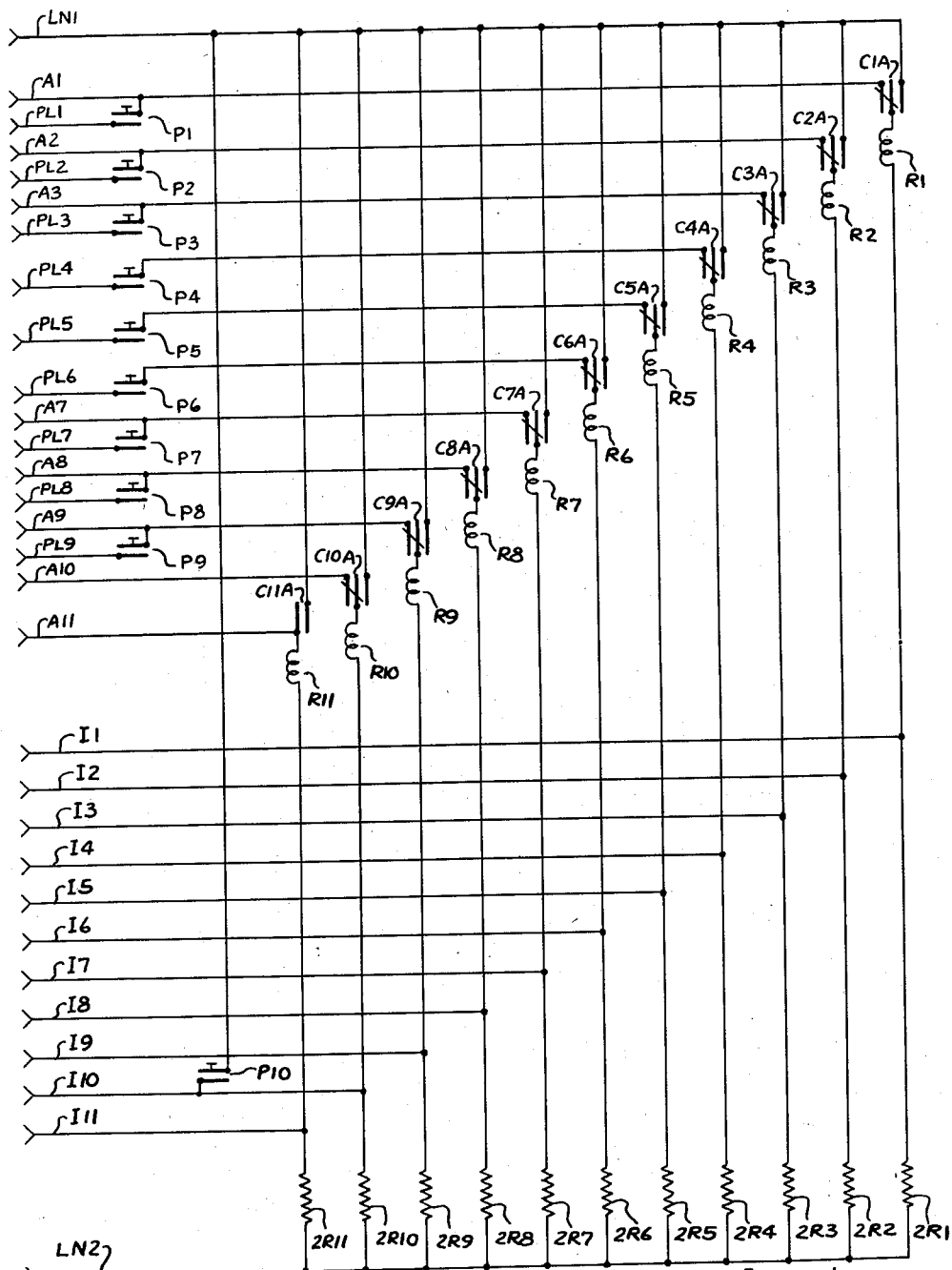
Figure 5:
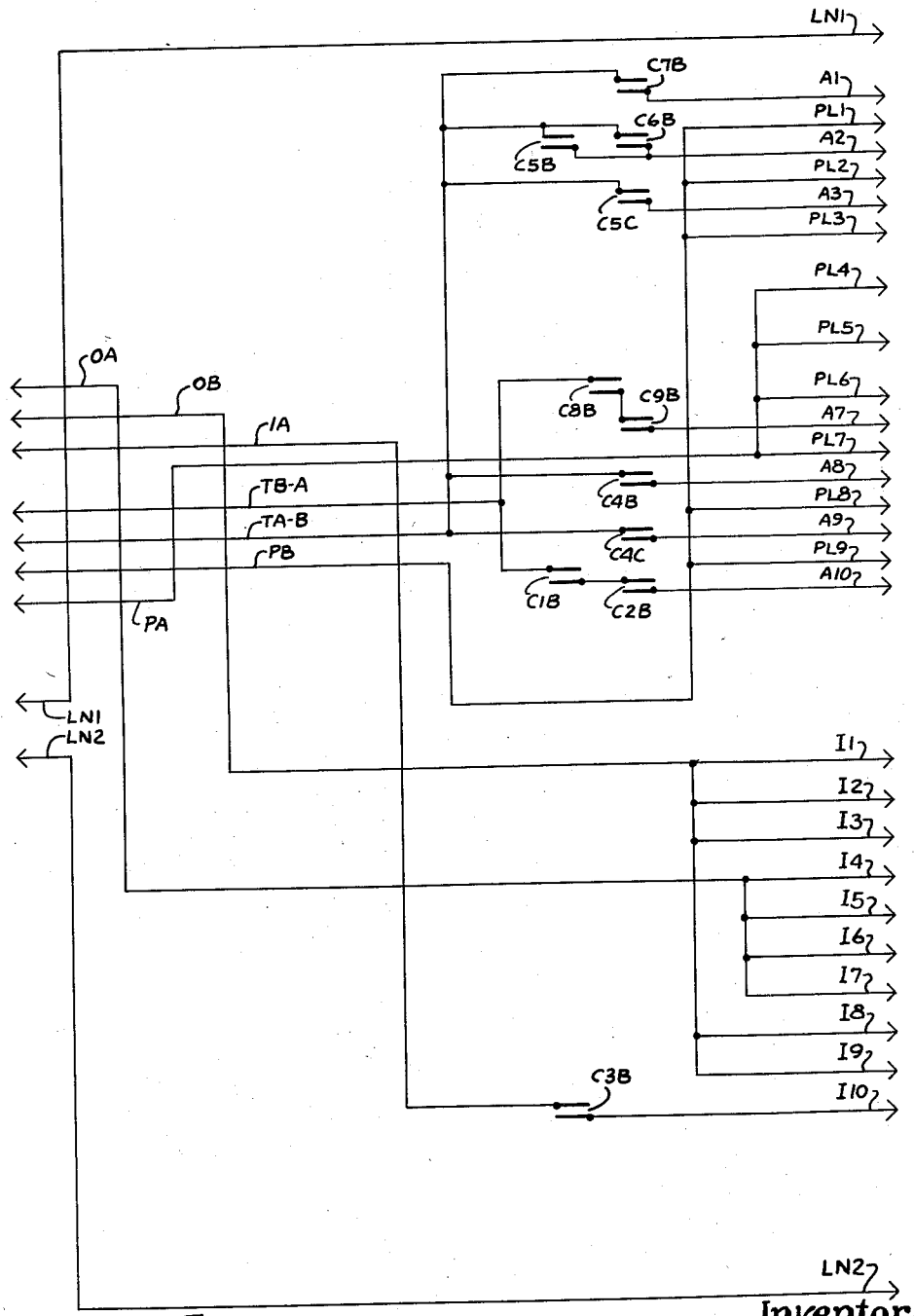

Figs. 2, 3 and 4 constitute a circuit diagram of the psychological testing device, when taken together with either Fig. 5, Fig. 6, or Fig. 7, the latter three figures representing changeable portions of the circuit.

Fig. 8 shows the manner in which Figs. 2, 3 and 4 are combined and aligned with either Fig. 5, Fig. 6 or Fig. 7 to produce a complete circuit diagram.

Figure 9:
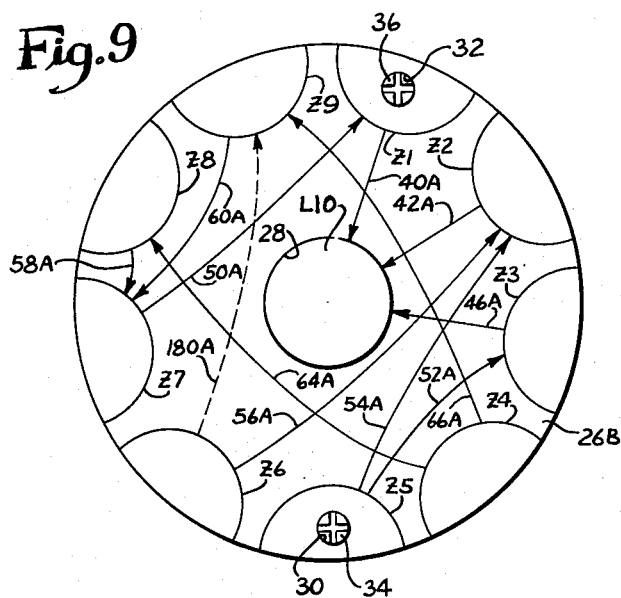
Figure 10:
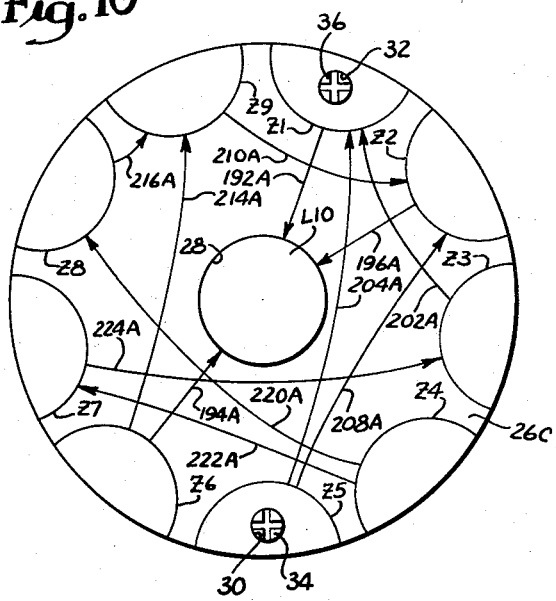

Figs. 9 and 10 are diagrammatic representations of problem disks adapted to be mounted on the front panel of the psychological testing device, in place of the disk shown thus mounted in Fig. 1, the disks of Figs. 1, 9 and 10 corresponding to the problems represented by the circuit diagrams of Figs. 5, 6 and 7.

Figure 11:
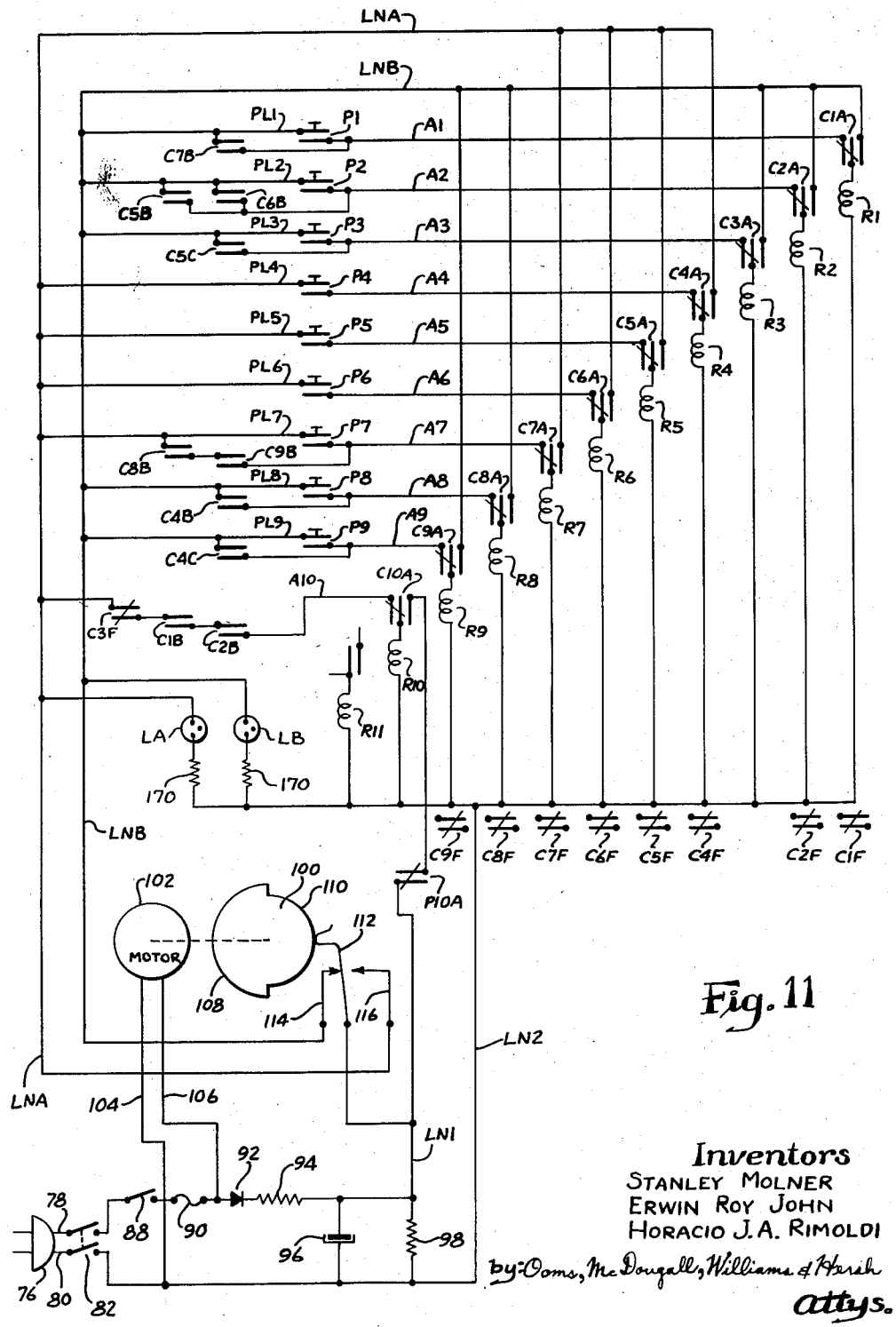

Fig. 11 is a circuit diagram showing a modified circuit for the psychological testing device.

Figure 12:
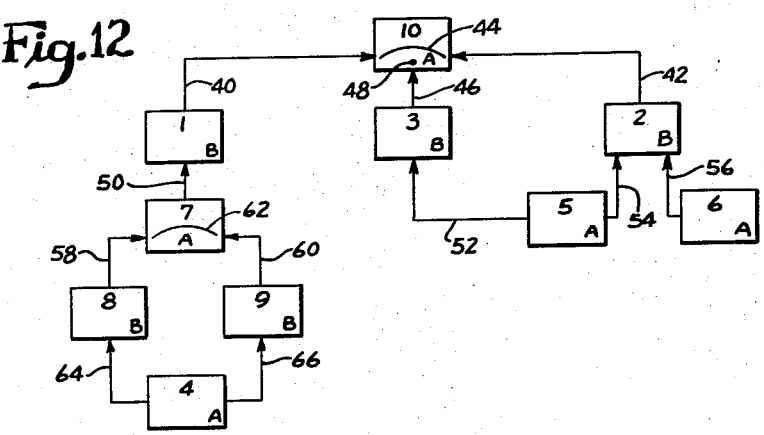
Figure 13:
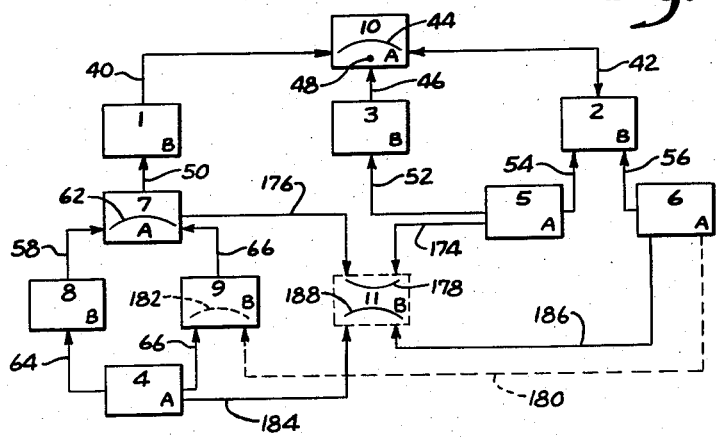
Figure 14:
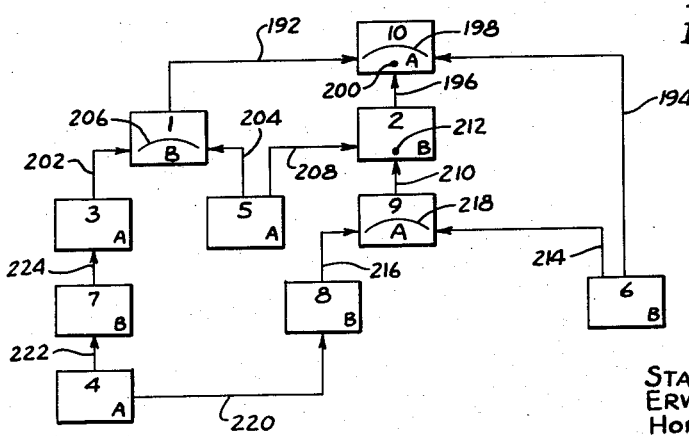

Figs. 12, 13 and 14 are symbolic or diagrammatic representations of the problems involved in the problem disks of Figs. 1, 9 and 10 and the circuit diagrams of Figs. 5, 6 and 7.

Figure 15:
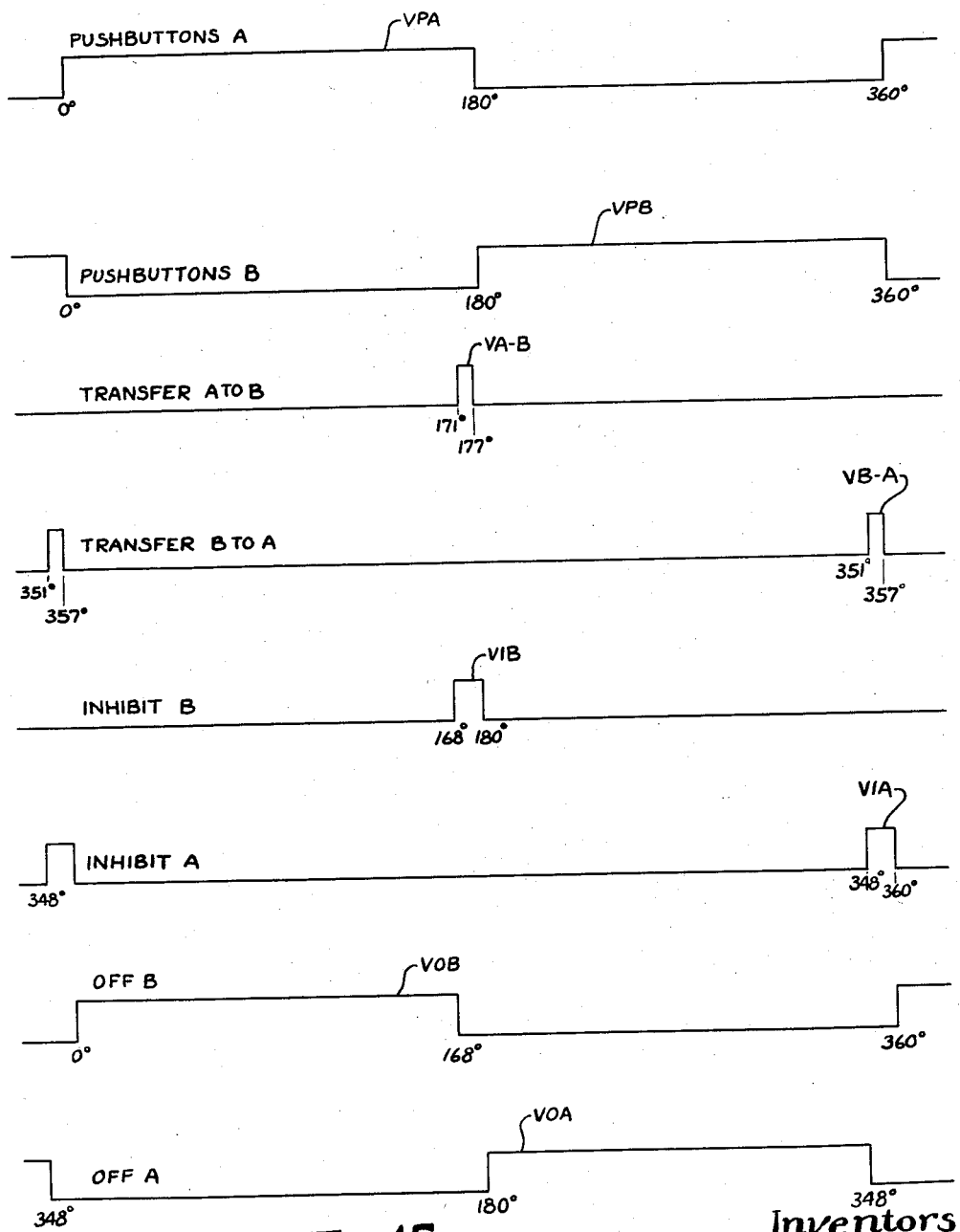

Fig. 15 is a diagrammatic representation of the waveforms of certain voltage pulses utilized in the testing device of Figs. 1–7.

As already indicated, Fig. 1 illustrates a psychological testing device 20 having a housing 22 provided with a control panel 24. The psychological testing device 20 is arranged to present a problem in abstract logical causation to a subject person. The problem involves arriving at a predetermined result represented by the operation of an output indicator or the like. In the illustrated testing device 20, the output indicator takes the form of an electric lamp L10. The output indicator L10 is operated through a chain or network of causation, embodied in the testing device 20, by unique manipulation of one or more input actuators. In the illustrated testing device 20, the input actuators take the form of three push button switches P4, P5 and P6. The input actuators are effective to operate input respondors which include input indicators. As shown in Fig. 1, the input indicators take the form of electric lamps L4, L5 and L6.

The chain or network of causation between the input actuators P4, P5 and P6 and the output indicator L10 involves one or more intermediate respondors, which include intermediate indicators. In Fig. 1, the intermediate indicators take the form of six electric lamps L1, L2, L3, L7, L8 and L9. The subject may directly operate the intermediate respondors and intermediate indicators L1–3 and L7–9 by operating intermediate actuators, which take the form of push button switches P1, P2, P3, P7, P8 and P9 in embodiment of Fig. 1.

It will be seen that the lamps L1–9 and the push buttons P1–9 are arranged in concentric circles on the control panel 24, with the lamps within the circle of the push buttons and opposite the corresponding push buttons. Thus, L1 is opposite P1, L2 opposite P2, and so forth, around the circles of lamps and push buttons.

The psychological testing device 20 is arranged to give the subject immediate access to partial information with regard to the chain or network of causal connections involving the push buttons P1–9 and the lamps L1–10. This might be done in various ways, but in the illustrated embodiment it is done by means of a clue disk or problem disk 26A which is mounted on the control panel 24 within the circle of the lamps L1–9.

The disk 26A has a central opening 28 which fits over and around the output indicator lamp L10. Additional openings 30 and 32 are provided in the disk 26A to receive screw heads or locating pins 34 and 36 mounted on the front panel 24. The pins 34 and 36 are spaced from each other somewhat less than 180° so that the disk 26A will fit over the pins in only one position with its front face uppermost.

In this case, the face of the problem disk 26A is marked with nine zones which are positioned opposite the lamps L1–9. The illustrated zones Z1–9 are generally semicircular in form. Each of the causal relations or links in the network of causation is represented by an arrow on the face of the disk 26A. The arrows extend between the various zones Z1–9, and between the zones and the output lamp L10. In other words, the arrows extend among the various indicator lamps L1–10. The direction of each arrow represents the direction of causation from cause to effect.

It will be realized, however, that several types of causation may exist between simple events. In the illustrated psychological testing device 20, four types of causation are utilized, consisting of direct causation, disjunctive causation, conjunctive causation, and inhibition.

When direct causation exists between first and second events, the occurrence of the first event is sufficient to cause the occurrence of the second event. In some cases, a third event may also cause the occurrence of the second event, in which case the first and third events are in disjunctive relation to the second event. In such a case, either the first or the third event is sufficient to cause the second event.

In conjunctive causation, two or more events must occur, substantially in unison, to cause the resultant event.

When the causal relationship between two events is inhibitive, the occurrence of the first event will prevent the occurrence of the second event, despite the occurrence of some other event that might otherwise cause the second event.

In order to permit unhurried observation and operation of the psychological testing device 20, the various events in the causal chain or network are given a periodic or cyclical time base which may be either synchronous or non-synchronous. Thus, the progression of the time base may be automatic or manually controlled. Each cycle of the time base may be divided into different parts, or may consist of a single undivided interval. In the illustrated embodiment, the cycle is divided into alternate half cycles that will be designed half cycle A and half cycle B. Certain of the events are assigned to half cycle A, while the others are assigned to half cycle B. In the illustrated device 20, the occurrence of the cycles is indicated by suitable indicating devices, such as the illustrated electric lamps LA and LB. Thus, the lamp LA is lighted during the A half cycle, while the lamp LB is lighted during the B half cycle.

The arrangement of the psychological testing device may be such that the operation of the output indicator L10 will persist, despite the time base. Moreover, the arrangement may be such that the push buttons P1–9 will be rendered ineffective, once the output indicator L10 has been operated. In this way, the fact that the output indicator has been operated will be preserved for observation by the subject and any person supervising or directing the psychological testing procedure.

However, means are provided to restore the psychological testing device to normal operation so that further testing may proceed. For this purpose, the illustrated testing device 20 has a push-button reset switch P10, which is effective to extinguish the output light L10 and restore the testing device to normal operating condition. Adjacent the reset push button P10 is a reset lamp L10A which is operated whenever the output lamp L10 is operated. The reset lamp L10A serves to warn the subject that it is necessary to reset the testing device in order to proceed with further testing.

The psychological testing device includes means whereby causal connections are established between the actuators P1–9 and the indicators L1–10. Such means may include various forms of mechanical, electromechanical, electronic or other respondors which are adapted to respond to operation of the actuators and to cause operation of predetermined indicators. Various respondor arrangements will be described in detail at a later point in this description. Because the nature and arrangement of the respondors is subject to wide variation, however, it may be of value to consider a sample problem on the basis of the foregoing broad discussion of the respondor arrangement.

Fig. 12 is a diagrammatic representation of such a sample problem. This is the same problem that is also represented on the problem disk 26A.

In Fig. 12, the ten major events in the operation of the testing device 20 are represented by rectangles labeled with the numbers 1–10. These rectangles represent the operation of the 10 lamps L1–10. It will be recalled that individual operation of the push buttons P1–9 will cause operation of the lamps L1–9. Because of the causal connections between the lamps and the push buttons, various lamps may be actuated in various other ways, and will in turn cause actuation of other lamps.

In the problem represented by Fig. 12, the operation of the output indicator or 10th lamp L10 is caused by conjunctive actuation of lamps 1 and 2, provided that lamp 3 is not also operated. The causal connections between lamps L1 and L2 and the output lamp L10 are represented by arrows 40 and 42 extending from rectangles 1 and 2 to rectangle 10 in Fig. 12. The conjunctive relation between these causal links is represented by a bracket 44 between the arrows 40 and 42. An arrow 46 is extended between rectangle 3 and rectangle 10 to represent the inhibitive causation between the third lamp L3 and the output lamp L10. A dot 48 at the end of the arrow indicates that this is an inhibitive link.

The problem disk 26A is provided with arrows 40A, 42A and 46A which correspond to the arrows 40, 42 and 46 in Fig. 12. Thus, the arrows 40A, 42A and 46A extend from the lamps L1, L2 and L3 to the output lamp L10. These arrows on the problem disk 26A indicate to the subject that there are causal links between the lamps in question. However, there is nothing on the problem disk to indicate the exact nature of the causal links.

The subject can determine the nature of the causal links represented by the arrows 40A, 42A and 46A by appropriate manipulation of the actuator push buttons P1, P2 and P3. If each of these push buttons is operated individually, the subject will observe that none of them is sufficient to cause operation of the output lamp L10. By appropriate experimentation with conjunctive actuation of the push buttons, the subject can determine that P1 and P2, but not P3, are sufficient to actuate the output lamp L10. Once the output lamp L10 has been lighted, it is necessary to operate the reset button P10 to extinguish the output lamp L10 and the reset lamp L10A, and to restore the testing device 20 to normal operation.

Before proceeding with the description, some additional attention should be given to the time base. In the problem, the ten events are divided between the A and B half cycles. The half cycle of each event is represented by the letter A or B on the corresponding rectangle in Fig. 12. It will be observed that the lighting of the tenth lamp L10 is an A event, while the lamps L1, L2 and L3 are lighted as B events. In other words, lamp L10 will be lighted during the A half cycle if lamps L1 and L2, but not L3, are lighted during the preceding B half cycle.

It will be observed from the legends in Fig. 12 that the lamps L5, L6 and L7 are adapted to be operated during the A half cycle. In Fig. 12, an arrow 50 extends between rectangles 7 and 1 to indicate that the actuation of the lamp L7 alone is sufficient to cause the actuation of the lamp L1. A corresponding arrow 50A appears on the problem disk 26A.

In Fig. 12, an arrow 52 extends between the rectangles 5 and 3 to indicate that the actuation of L5 alone is sufficient to cause the actuation of L3. On the problem disk 26A, a corresponding arrow 52A appears.

Rectangles 5 and 2 are connected by an arrow 54. Another arrow 56 connects rectangle 6 to rectangle 2. Corresponding arrows 54A and 56A are on the problem disk 26A. These arrows indicate either L5 or L6 is sufficient to cause the lighting of L2.

By appropriate experimentation, the subject can determine the nature of the causal links represented by the arrows 50A, 52A, 54A and 56A. If the subject presses push button P7 during an A half cycle, lamp L1 will be lighted during the next B half cycle. If push button P5 is pressed during an A half cycle, lamps 2 and 3 will be lighted during the next B half cycle. Likewise, the operation of push button P6 during an A half cycle will cause the lamp L2 to be operated during the next B half cycle.

It will be observed from Fig. 12 that the lamps L8 and L9 are adapted to be operated during the B half cycle. Arrows 58 and 60 extend between the rectangles 8 and 9 and the rectangle 7 and are connected by a bracket 62, to indicate that conjunctive operation of lamps L8 and L9 is necessary and sufficient to cause lamp 7 to operate during the next A half cycle. Corresponding arrows 58A and 60A appear on the problem disk.

As indicated in Fig. 12, the lamp L4 is adapted to be lighted during the A half cycle. Arrows 64 and 66 extend from the rectangle 4 to the rectangles 8 and 9 to indicate that the lighting of lamp L4 alone will cause the lighting of both L8 and L9 during the next B half cycle. Corresponding arrows 64A and 66A appear on the problem disk 26A. By appropriate experimentation or logical inference, the subject can determine the nature of the causal links represented by the arrows 58A, 60A, 64A and 66A on the problem disk 26A.

It will be recalled that the object of the problem or game is to light the output lamp L10 by manipulating only the input push buttons P4, P5 and P6. The other push buttons are merely information push buttons, and may not be employed in the final solution. By experimentation alone, or by experimentation combined with logical inference, the subject can determine the nature of all of the causal links involved in the causal network. He then has all of the facts necessary to solve the problem. He then can infer that the output lamp L10 can be lighted by pressing push buttons P4 and P6 during successive A half cycles, without the necessity of operating any push button during the intervening B half cycles. The output lamp L10 will be lighted during the third A half cycle.

The sequence of operations in the correct solution will be readily apparent. If push button P4 is pushed during the first A half cycle, lamp L4 will be lighted immediately and lamps L8 and L9 will be lighted during the next B half cycle. Lamp L7 will be lighted during the second A cycle. During this same A half cycle, push button P6 must be operated. This will cause immediate lighting of the lamp L6 and the lighting of the lamp L2 during the next B half cycle. The lamp L1 will also be lighted during this half cycle, by causal transfer from lamp L7. During the third A half cycle, the output lamp L10 will be lighted by causal transfer from lamps L1 and L2.

It will be noted that the actuation of push button P5 during the second A half cycle will not result in a resolution, because L5 causes L3, as well as L2, and L3 inhibits L10 and thereby spoils the solution.

In the operation of the testing device 20, each event or step in the problem solving process is accompanied by the lighting of a lamp and hence is easily observed. Thus, the details of the problem solving process are made available. The events may be recorded manually, or by means of a suitable automatic recorder.

Before being tested, the subject is given standard preliminary instructions in the operation of the testing device. The solution of a simple problem may be demonstrated. The subject is generally instructed to arrive at the solution in a minimum of time and with a minimum number of push-button operations. He is thus encouraged to gain information by logical inference from the problem disk when possible. He is told that each arrow on the problem disk represents a causal connection, direct, disjunctive, conjunctive or inhibitive, between the lamps, and that there is an arrow for each causal link. The subject is instructed that he must hold down a push button until the lamp corresponding to that push button comes on in order for the push button to be effective. He is told that the lamp for that push button will remain lighted for one half cycle of the time base, and that any consequences of the lighting of the lamp will become apparent during the next and subsequent half cycles. He is further told that each problem is soluble.

The half cycles of the time base may be of any suitable length, so that the subject can observe the lighting of the lamps and operate any desired push buttons without being unduly hurried. A half cycle length of three seconds has been found satisfactory in practice. As already noted, the progression of the time base may be manually controlled, by the subject or the person giving the test, in which case, the half cycles may be of indefinite, variable length.

With this preliminary discussion as a base, it will be found profitable to consider the detailed circuit diagram of Figs. 2, 3 and 4, taken initially in conjunction with Fig. 5, which represents the changeable portion of the circuit and corresponds to the problem of Figs. 1 and 12.

The nine push buttons P1–9 will be found in Fig. 3, while the ten lamps L1–10 will be seen in Fig. 4. The reset push button switch P10 appears in Fig. 3, while the reset lamp L10A appears in Fig. 4. The lamps L1–10A may be neon or other gaseous lamps with current limiting resistors 70 in series therewith.

The push button switches P1–10 may comprise simple pairs of normally open contacts. Additional pairs of normally open contacts P1A–P9A may be associated with the push button switches P1–9 for the purpose of operating an automatic recorder, as will be developed in greater detail below.

Respondors are associated with the push buttons P1–10 and are adapted to operate the lamps L1–10. Generally the respondors have a plurality of stable states, and are capable of giving some sort of indication when a change of state occurs. In other words, the respondors are memory devices. As already indicated, the respondors may be mechanical, electrical, electromechanical, magnetic or electronic in nature. Thus, the respondors might take the form of electron discharge or gaseous discharge tubes, transistors, saturable reactors, or various other devices. However, in the illustrated embodiments, the respondors take the form of electromagnetic and electromechanical relays R1–R10, corresponding to the lamps L1–10. There is also an eleventh relay R11 which may be made to change the nature of certain problems in response to certain events, generally as a penalty assessed against the subject for persisting in error or compounding error in working out the solution to the problem. Additional discussion of the eleventh relay R11 will be given at a subsequent point in the description.

The push-button switches P1–P9 are connected so as to actuate the relays R1–R9. Moreover, the relays are arranged so that they will lock in, once they are actuated, until the beginning of the next half cycle of the time base. Thus, the relays R1–R10 have triple contacts C1A–C10A. Each set of triple contacts comprises a normally closed pair and a normally open pair with one contact common to both pairs. One side of the winding of each of the relays R1–R10 is connected to this common contact. Actuating lines A1–A9 are connected between each of the push-button switches P1–9 and to the other contact of the normally closed pair on the triple contacts C1A–9A. The other contacts of the normally open pair on each of the triple contacts C1A–9A serves as a holding contact and is connected directly to a holding line LN1, supplied with power in a manner to be described later. The push-button switches P1–9 are supplied with power impulses, for actuating the relays R1–9, through push-button supply lines PL1–9.

In the case of the tenth or output relay R10, the common contact of the triple set C10A is connected to one side of the relay winding as already indicated. The other contact of the normally closed pair is connected to an actuating line A10, while the other contact of the normally open pair is connected to the holding line LN1.

The eleventh relay R11 has a normally open pair of contacts C11A, one of which is connected to the holding line LN1. The other is connected both to one side of the relay winding and to an actuating line A11.

Actuation of the relays R1–11 may be effected simply by applying voltage across the windings thereof. Inhibition of the relays may be achieved in various ways. Thus, a relay may be inhibited by introducing open contacts into the energizing circuit for the relay. An alternative method of inhibition is to short circuit or bypass the relay winding. This latter method is utilized in the arrangement of Figs. 2–4, primarily for the reason that both actuation and inhibition may thereby be accomplished by normally open relay contacts.

Accordingly, inhibition lines I1–I11 are connected to the other side of the winding of each of the relays R1–R11. It will be understood that the establishment of a connection between the holding line LN1 and any of the inhibition lines I1–I11 will short circuit or bypass the corresponding relay winding and thereby inhibit the relay, despite the application of actuating voltage to the corresponding actuating line. Resistors or other impedances ZR1–ZR11 are connected in series with the windings of the relays R1–11, and between the inhibiting lines I1–I11 and a power supply return line LN2, to prevent the short circuiting of the power supply when a relay is inhibited.

It will be seen from Fig. 4 that the first relay R1 has four pairs of normally open contacts C1B–E. Similarly, the relays R2–9 have four sets of normally open contacts C2B–C9E. The contacts C1E–C9E of the fourth set are connected in series with the respective indicator lamps L1–L9, between a pair of power supply lines 72 and 74. Thus, each of the lamps L1–L9 is lighted when the corresponding relay is energized.

The other three sets of normally open contacts C1B– C9D on the relays R1–9 are employed to establish causal links or transfer connections between the various relays.

The tenth or output relay R10 may have a single pair of normally closed contacts C10B, and a single pair of normally open contacts C10E. It will be seen from Fig. 4 that the contacts C10E are connected in series with the output lamp L10, between the power lines 72 and 74. The reset lamp L10A is connected in parallel with the output lamp L10, thus, the output and reset lamps L10 and L10A are lighted when the tenth relay R10 is energized. The normally closed contacts C10B are employed to disable the push buttons P1–9 and maintain the output lamp L10–A in a lighted condition until the reset push button P10 is operated. The connection of the contact C10B will be described in greater detail later.

The eleventh relay R11 may be provided with five triple sets of contacts C11B–F. Each triple set of contacts has a normally closed pair and a normally open pair with one of the contacts common to both pairs. The manner of connection of these contacts C11B–F will be described in greater detail later in connection with Fig. 6.

The push button lines of the A relays are supplied with energizing voltage during the A half cycle of the time base, while the push button lines of the B relays are supplied with voltage during the B half cycle. Various means may be employed for this purpose, such as the arrangement illustrated in Fig. 2. The voltage to energize the relays is derived from any suitable source, such as an ordinary alternating current power line, at 110 volts or any other suitable voltage. Thus, the illustrated testing device 20 is provided with a power plug 76 adapted to be inserted into an ordinary wall receptacle or the like connected to such a power line. Line wires 78 and 80 are connected between the plug and a double pole single throw line switch 82. Leads 84 and 86 extend from the line switch 82. It will be seen that a normally open interlock switch 88 and a fuse 90 are connected in series with the lead 84. The interlock switch 88 is held closed when the testing device is in its normal operating condition, as in the case of the usual interlock switch. The lead 84 is connected directly to the return power line LN2.

In this case, direct current is employed to operate the relays R1–11, although it would be feasible to employ alternating current. Thus, a simple diode rectifier 92 and a filtering resistor 94 or other impedance are connected in series between the power lead 86 and the direct current power line LN1.

A filtering capacitor 96 is connected between the direct current lines LN1 and LN2 to smooth out ripple and provide a nearly constant direct voltage between the lines LN1 and LN2. It will be seen that a load or discharge resistor 98 is connected across the capacitor 96.

Push-button supply lines PA and PB are provided to supply the A and B relays with voltage during the A and B half cycles. Thus, a voltage pulse VPA is applied to the line PA during the A half cycle. During the B half cycle, a voltage VPB pulse is applied to the line PB. The waveform of these pulses may be seen in Fig. 15. It will be observed that the pulse VPA extends for the first half of the cycle, while the pulse VPB extends for the second half. In other words, the pulse VPA extends from zero to 180°, while the pulse VPB extends from 180° to 360° of the cycle.

Various means might be provided to derive the push button energizing pulses VPA and VPB. The illustrated arrangement of Fig. 2 includes a disk-shaped cam 100, rotated at a fairly slow speed by an electric motor 102. The motor 102 may be energized by means of leads 104 and 106 connected across the alternating current supply leads 84 and 86. The speed of the cam 100 will vary according to the length of the time cycle. For a six second time cycle, the speed of the cam 100 will be 10 r.p.m.

It will be seen that the cam 100 has a high portion 108, representing the A half cycle, and a low portion 110 representing the B half cycle. The high portion 108 extends from zero to 180°, while the low portion 110 extends from 180° to 360°. A contact 112 is operated by the cam 100 and is adapted to engage a contact 114 when the contact 112 is on the low portion 110 of the cam. The contact 112 engages a contact 116 when the contact 112 is on the high portion 108 of the cam.

In this case, the contact 114 is connected to a relay 118 having four sets of triple contacts 118A–D. Thus, the relay 118 is energized during the B half cycle and de-energized during the A half cycle. Each of the contact sets 118A–D has a normally closed pair and a normally open pair of contacts with one contact common to both pairs. The triple contacts 118D are employed to supply the voltage pulses for the push-button lines PA and PB. Thus, the common contact of the triple set 118D is connected through the normally closed contacts C10B on the relay R10 to the direct current power line LN1. The other contact of the normally closed pair is connected to line PA, while the other contact of the normally open pair is connected to the line PB. It will now be apparent that the voltage to the push-button lines PA and PB will be cut off when the output relay R10 is energized, inasmuch as such energization opens the contact C10B.

Direct current to operate the relay 118 is derived from a separate power supply. Thus, a simple diode rectifier 120 and a filtering resistor 122 or other impedance are connected between the alternating current line 86 and a direct current line 124. It will be seen that the relay 118, the contacts 112 and 114, and a current limiting resistor or other impedance 126 are connected in series between the line 124 and the common return line LN2. A filtering capacitor 128 is connected between the lines 124 and LN2. It will be observed that the lamp energizing lines 72 and 74 are connected to the lines 124 and LN2.

It will be recalled that the contact 116 is engaged by the contact 112 during the A half cycle. A counter 130 is connected between the contact 116 and the return line LN2. Thus, the counter is operated once during each cycle and may be employed to count the number of cycles that elapse during the solution of any given problem. A diode 132 is connected across the counter 130 in a direction reversely related to the direction of the energizing voltage applied to the counter.

As already indicated, the relays R1–R11 are divided into A and B relays for any given problem. For the problem represented by Fig. 12 and the problem disk 26A of Fig. 1, the relays R4, R5, R6, R7 and R10 are A relays, operable during the A half cycle, while the relays R1, R2, R3, R8 and R9 are B relays. For other problems, the selection of A and B relays may be different. Thus, the testing device 20 makes provision for changing the connections to the relays for each problem. Provision is also made for changing the connections whereby causal links are established between the various relays. All of these changeable connections may be established in various ways, such as by changeover switches or plug-in components. It has been found convenient to employ a plug board to make all of the changeable connections for each problem. Fig. 5 is a diagrammatic illustration of a plug board 134 for the problem of Fig. 12. A complete circuit diagram of the testing device 20 for this problem will be produced if Figs. 2, 3, 4 and 5 are arranged as illustrated in Fig. 8.

From Fig. 5 it will be seen that, for the first problem, the A push-button supply line PA is connected to the push-button lines PL4–7 for the corresponding relays R4–7. The B push-button supply line PB is connected to push-button lines PL1, PL2, PL3, PL8 and PL9. Thus, any A relay will be energized if its push button is pressed during the A half cycle, while any B relay will be energized by operation of its push button during the B half cycle. During the B half cycle, the A push buttons are not energized. Likewise, the B push buttons are not energized during the A half cycle.

It will be recalled that the relays R1–9 lock in, once they are energized, by virtue of the manner in which the triple contacts C1A–C9A act as holding contacts to connect the relays to the line LN1 independently of the push buttons P1–9. The testing device 20 is arranged, however, to turn off all A relays at the end of the A half cycle, and all B relays at the end of the B half cycle. This may be done in various ways, such as by opening the connections to the power line, or by effectively short circuiting the relay windings. The latter scheme is employed in the present instance. In other words, the A relays are turned off by establishing connections between the power line LN1, or a voltage source of similar voltage, and the corresponding inhibition lines. The B relays are turned off in like manner. In Fig. 2, it will be observed that off lines OA and OB are provided to deliver off pulses of voltage to the inhibition lines for the A and B relays. For the problem of Fig. 5, the off line OA is connected to the inhibition lines I4–7, while the off line OB is connected to the inhibition lines I1–3, 8 and 9.

It is possible to use the push button pulses for the B relays as off pulses for the A relays, while using the push button pulses for the A relays as off pulses for the B relays. However, it is preferred to provide slightly different off pulses, of slightly shorter duration. These off pulses are shown in Fig. 15 as VOA and VOB. Thus, the off pulse VOA extends from 180° to 348° of the cycle, while the pulse VOB extends from zero to 168°. This leaves a 12° interval in which causal transfers may be made from the A relays to the B relays and from the B relays to the A relays. This point will be developed in greater detail later.

The off pulses VOA and VOB may be derived in various ways, as by special cams. Thus, in the arrangement of Fig. 2, these pulses are derived with the aid of a cam 136, acting in conjunction with the cam 100 and the timing relay 118. It will be seen that the cam 136 has two diametrically opposite high portions 138 and 140 and two diametrically opposite low portions 142 and 144. Each of the low portions 142 and 144 is about 12° in width. It will be understood that the exact width is subject to variation. A contact 146 is adapted to follow the cam 136 so as to engage contacts 148 to 150 for the low and high portions of the cam 136. The contact 146 is connected to the power line LN1. Thus, 12° pulses appear on the contact 148, while pulses having a duration of 168° appear on the contact 150. The relay 118 is employed to route alternate 168° pulses to the off lines OA and OB. Thus, the common contact of the triple set 118A is connected to the contact 150. The other contact of the normally closed pair is connected to off line OB, while the other contact of the normally open pair is connected to off line OA. During the A half cycle, the 168° pulse is routed to the line OB. During the B half cycle, the routing of the 168° off pulse is to the line OA.

It has already been indicated that the causal connections between the lamps L1–10 are established by interconnecting the relays R1–10 so as to produce transfers between the relays. The normally open relay contacts C1B–C9D are employed to effect such transfers. In general, the contacts of any given relay are employed to route transfer voltage to some other relay that is to be operated by the given relay. The details of the transfer connections are subject to variation. In the illustrated testing device 20, the normally open relay contacts C1B–9D are employed to route transfer pulses from transfer lines TB–A and TA–B to the actuating lines A1–11. The transfer line TB–A supplies pulses adapted to effect transfers from B relays to A relays, while the line TA–B supplies pulses for effecting transfers from A relays to B relays. In the present arrangement, these transfer pulses are short in duration and are timed to occur near the end of the half cycles. In Fig. 15, these pulses are shown as VA–B and VB–A. It will be seen that the pulse VA–B for transfer from A to B relays occurs near the end of the A half cycle. It is 6° in duration and extends from 171° to 177° in the cycle. The transfer pulse VB–A occurs near the end of the B half cycle and extends for 6° from 351° to 357°. It will be understood that the length and timing of these pulses are subject to variation.

The transfer pulses VA–B and VB–A may be derived in various ways. In the arrangement of Fig. 2, the pulses are derived with the aid of a cam, acting in conjunction with the timing relay 118 and the cam 100. The cam 154 has diametrically opposite low portions 156, each of 6° in width, and diametrically opposite high portions 158 extending between the low portions. A contact 160 follows the cam 154 and is adapted to engage a contact 162 when each of the low portions 156 is encountered. It will be seen that the contact 160 is connected to the power line LN1 through the normally closed relay contacts C10B. Thus, 6° pulses at 180° intervals are produced on the contact 162. The relay 118 is employed to route these pulses alternately to the transfer lines TA–B and TB–A. Thus, the contact 162 is connected to the common contact between the normally closed and normally open pair of triple relay contacts 118C. The other contact of the normally closed pair is connected to transfer line TA–B, while the other contact of the normally open pair is connected to transfer line TB–A. During the B half cycle, the relay 118 is energized and a transfer pulse is routed to the transfer line TB–A. A transfer pulse is routed to the transfer line TA–B during the A half cycle.

In general, the routing of the transfer pulses to the actuating lines A1–11 is different for each problem. Thus, the contacts to effect such routing are established by the plug board or other connection changing device. The transfer connections for the problem represented in Fig. 12 are established by the plug board 134 of Fig. 5. In Fig. 5 the relay contacts for establishing transfers are reproduced as though they were on the plug board but, of course, they are actually connected to the plug board by plug connections.

In the problem of Figs. 5 and 12, relays R1 and R2 act conjunctively to actuate relay R10. Relays R1 and R2 are B relays, while relay R10 is an A relay. Thus, the transfer is from B to A. Accordingly, the normally open relay contacts C1B and C2B are connected in series between the transfer line TB–A and the actuating line A10. Closure of both of these contacts will route a transfer pulse to the output relay R10 so as to actuate the relay just before the beginning of the A half cycle.

A direct causal connection is established between relays R7 and R1 by connecting the relay contacts C7B between the transfer line TA–B and the actuating line A1. Disjunctive causal connections between relays R5 and R6, on one hand, and relay R2, on the other, are established by connecting the relay contacts C5B and C6B in parallel between the transfer line TA–B and the actuating line A2. Direct causation between R5 and R3 is established by connecting the contacts C5B between the transfer line TA–B and the actuating line A3.

A relation of conjunctive causation from the relays R8 and R9 is established by connecting the contacts C8B and C9B from the transfer line TB–A to the actuating line A7. Simple causation from relay R4 to relays R8 and R9 is established by connecting the relay contacts C4B and C4C between the transfer line TA–B and the actuating lines A8 and A9. This accounts for all of the causal links in the problem of Fig. 12, other than the inhibitive link between relays R3 and R10.

As already indicated, inhibition may be accomplished in various ways, as by opening the holding or actuating circuits for the relays, or by effectively short circuiting or bypassing the relays. The latter type of inhibition may be accomplished by routing the power supply voltage to the inhibition lines I1–11. In the testing device 20, the normally open relay contacts C1B–C9D are employed to route inhibition pulses from inhibition supply lines IA and IB to the inhibition lines I1–11.

In the present arrangement, the inhibition pulses are timed to start shortly before the corresponding transfer pulses, and to terminate shortly thereafter. In this way, a relay will be inhibited during the entire time in which it might receive a transfer pulse. The inhibition pulses are shown as VIA and VIB in Fig. 15. The pulse VIB occurs at the end of the A half cycle and extends from 168° to 180°. Similarly, the pulse VIA occurs at the end of the B half cycle and extends from 348° to 360°. It will be noted that the inhibition pulses occur during the intervals between the off pulses VOA and VOB. During these intervals, the relays are subject to actuation by the transfer pulses, unless they are inhibited by the inhibition pulses.

The inhibition pulses may be derived in various ways. In the arrangement of Fig. 2, they are derived by the cooperative action of the cams 100 and 136 and the timing relay 118. It will be recalled that 12° pulses, occurring at 180° intervals, appear on the contact 148. These pulses are routed to the inhibition lines IA and IB by the triple contacts 118B.

The problem of Fig. 12 embodies only one inhibitive relation, the one between the relays R3 and R10. This relation is established simply by connecting the relay contacts C3B between the inhibition supply line IA and the inhibition line I10. It will be noted that normally open contacts are employed to establish inhibitive causal links as well as direct and conjunctive causal links between the various relays. Employing normally open contacts to establish all types of causal links results in maximum flexibility and diversity in setting up problems, as well as maximum economy in relay contacts.

It has already been indicated that extra push-button contacts P2A–P9A are provided to operate a recording device or the like for recording the various push-button operations. These contacts P1A–P9A are connected in series with respective isolating diodes D1A–D9A between the power line 124 and one side of a counter 166. The other side of the counter is connected to the common power line LN2. A reversely connected diode is connected across the counter 166. It will be realized that the counter 166 counts the total number of button pushes. Additional isolating diodes D1B–D9B are connected between the push-button contacts P1A–P9A and recorder terminals RT1–RT9. Additional recorder terminals RTX and RTY are connected across the counter 166. It will be seen that the terminal RTY is connected to the line LN2 and thus serves as a return line. Various recording devices may be connected to the recorder terminals. Thus, nine separate counters might be connected from the terminals RT1–RT9 to the terminal RTY. Another scheme is to employ a graphical recorder to indicate the time and duration of all of the button pushes.

In the correct solution of the problem of Fig. 12, the subject presses push button P4 and holds it in actuated position until lamp L4 is lighted. This occurs when relay R4 is energized by the push-button supply pulse VPA during the A half cycle. The triple contacts C4A establish a holding circuit for the relay R4 to the power line LN1. Near the end of the A half cycle, the transfer pulse VA–B comes over the line TA–B and is routed to the actuating lines A8 and A9 by the relay contacts C4B and C4C, which are closed at this time by the actuation of the relay R4. The transfer pulse energizes the relays R8 and R9, with the result that lamps L8 and L9 are lighted. At the end of the A half cycle, the off pulse VOA turns off the relay R4 by supplying a voltage on its inhibition line I4 equal to the holding voltage.

The relays R8 and R9 are held in by their holding contacts C8A and C9A. No button pushes are made during this B half cycle. Near the end of the B half cycle, the transfer pulse VB–A is routed from line TB–A to the actuating lines A7 by the relay contacts C8B and C9B, so as to actuate the relay R7. This lights the lamp L7. At the end of the B half cycle, the off pulse VOB turns off the relays R8 and R9.

During the following A half-cycle, the subject presses the push button P6. The relay R6 will then be energized so as to light the lamp L6. Near the end of the A half-cycle, the transfer pulse TA–B is routed from the transfer line TA–B to the actuating lines A1 and A2, by the relay contacts C7B and C6B. The transfer pulse energizes the relays R1 and R2. At the end of the A half-cycle, the off pulse VOA turns off the relays R6 and R7.

No button pushes are made by the subject during the following B half-cycle. Near the end of this half-cycle, the transfer pulse VB–A is routed to the actuating line A10 through the relay contacts C1B and C2B, connected in series. The output relay R10 is energized and the output lamp L10 is lighted to indicate that a solution has been achieved. The energization of the relay R10 opens the contacts C10B and thereby disconnects the push-button lines PA and PB and the transfer lines TA–B and TB–A from the power supply line LN1. Thus, the push buttons are disabled and transfers between relays are prevented, so that the solution will be preserved. The output relay locks in by virtue of its holding contacts C10A.

The testing device 20 may be restored to normal operating condition by operating the reset push-button switch P10. This connects the power line LN1 to the inhibition line I10 and effectively short circuits the output relay R10. As a result, it is de-energized. The contacts C10B close to re-energize the push-button supply lines PA and PB and the transfer lines TA–B and TB–A.

In Fig. 2, the time base lamps LA and LB are shown connected from the off lines OB and OA to the power supply return line LN2. Thus, the B off pulse VOB is applied to the A lamp LA, while the pulse VOA is applied to the lamp LB. With this arrangement, the lamps continue to be lighted alternatively when the solution is achieved. Alternatively, the lamps may be connected to the push-button lines PA and PB, in which case the time base lamp will be extinguished when the solution is achieved. Another alternative is to provide only one lamp, which is alternatively on and off. The lamps LA and LB may be gaseous lamps with current limiting resistors 170 in series therewith.

It should be noted that the triple contacts C1A–C10A are make-before-break contacts so that the holding circuits for the relays R1–10 are established before the actuating circuits are broken.

Figs. 6, 9 and 13 illustrate a second problem which involves the use of the eleventh relay R11. This relay is adapted to change the nature of the problem, as a penalty, for compounding error or persisting in error. The problem of Figs. 6, 9 and 13 is very similar to the problem of Figs. 1, 5 and 12, and has the same principal solution. However, the eleventh relay is employed to change the nature of the problem if the subject persists in or compounds the error of attempting to achieve a solution by the use of the fifth push button P5. It will be recalled that push button P5, like push button P6, is effective to actuate lamp L2. This is one step in the correct solution. However, push button P5 also actuates lamp L3, which in turn inhibits the output lamp L10 and spoils the solution. The subject can readily determine this fact by appropriate experimentation with push buttons 1, 2, 3, 5 and 6. In fact, once the subject knows that the lighting of the lamps L1 and L2, but not L3, causes lamp L10 to light, he can immediately infer that the lighting of the lamp L5 will spoil the solution by actuating lamp L3 and thereby inhibiting the output lamp L10.

Since many subjects will determine the status of push button P5 and lamp L5 in the problem by experimentation, rather than by inference, no penalty is attached to the mere operation of push button P5 by itself. However, if the subject persists in operating this push button, to the extent of operating it in conjunction with other push buttons properly necessary for the solution, a penalty is imposed. In the particular problem of Fig. 13, the arrangement is such that L5 and L7 act in conjunction to operate the eleventh relay R11. These casual relations are indicated by arrows 174 and 176 extending from rectangles 5 and 7 to rectangle 11. A bracket 178 connects the ends of the arrows to indicate that the causation is conjunctive. Rectangle 11 is shown in dotted lines to indicate that relay R11 does not play a part in the normal solution of the problem.

Relay R11 does not directly actuate or inhibit any of the other relays or lamps, but instead is effective to introduce one or more new causal links or relations into the problem. It is also possible to arrange relay R11 to change the nature of one or more existing links, or the relation of one or more actuators to the time cycle. In the problem of Fig. 13, the new causal factors are shown in dotted lines. The main effect of relay R11 is to require that not only relay R4, but also relay R6 be actuated to cause the actuation of relay R9. In the original problem, relay R9 is actuated by relay R4 alone. This additional link is indicated by an arrow 180 extending from rectangle 6 to rectangle 9. A bracket 182 extends between the arrows 180 and 66 to indicate that the causal links from relays R6 and R4 to relay R9 are conjunctive.

With relay R11 actuated, the first step in the correct solution is the conjunctive operation of push buttons P4 and P6. In order that the penalty imposed upon the subject may not be unduly severe, this conjunctive operation of push buttons is also made sufficient to de-energize the relay R11. These conjunctive causal links are indicated by arrows 184 and 186 extending from rectangles 4 and 6 to rectangle 11, with a bracket 188 between the arrows. It will be apparent that the effect of the eleventh relay R11 could be made much more complicated.

When a subject is presented with the problem of Figs. 6, 9 and 13, he is ordinarily told that the problem may change automatically in character and solution if he persists in error. It is possible to indicate the changing nature of the problem in varying ways on the problem disk. Fig. 9 illustrates a problem disk 26B for the second problem. This particular disk 26B is the same as the disk 26A except that a dotted arrow 180A is added between zones Z6 and Z9. This arrow corresponds to the arrow 180 in Fig. 13. The subject may be told that this particular arrow is dotted because it plays a part in the problem only under certain circumstances. Of course, if the subject is perceptive, he will realize immediately that this is the penalty arrow or causal link. It would be possible to omit this arrow entirely from the problem disk, leaving the disk the same as in Fig. 1. Another possibility would be to indicate the eleventh relay as a separate zone on the problem disk and show all of the causal links to and from the eleventh relay by appropriate arrows.

Fig. 6 illustrates the plug board connections for the second problem, involving the eleventh relay R11. The plug board of Fig. 6 will be designated 190. In the connections of the plug board 190, provision is made for actuating the relay R11 as the result of conjunctive actuation of the relay R5 and R7. For this purpose, the relay contacts C5D and C7C are connected in series between the transfer line TA–B and the actuating line A11 for relay R11. When the relay R11 is actuated, it locks in by virtue of the holding contacts C11A.

Provision is also made in the arrangement of Fig. 6 for the causal consequences of the actuation of relay R11.

To this end, the relay contacts C6D are connected in series with the relay contacts C4C between the transfer line TA–B and the actuating line A9 of relay R9. However, the normally closed pair of the relay contacts C11B is connected in parallel with the normally open contacts C6D. Thus, the contacts C6D are short circuited when the relay R11 is not energized. Accordingly, the relay R9 is normally actuated by the actuation of relay R4 alone. When relay R11 is actuated, it is also necessary to actuate relay R6 to operate relay R9.

Means are also provided to de-energize the eleventh relay R11 in response to conjunctive actuation of relays R4 and R6. For this purpose, the relay contacts C4D and C6C are connected in series between the inhibition supply line IB and the inhibition line I11 of relay R11. All of the other connections of the plug board 190 for the second problem are the same as in the plug board 134 for the first problem of Fig. 5.

In some problems, it is necessary or desirable to introduce diodes into the transfer connections between relays. The diodes may serve to isolate various leads and prevent unwanted cross-transmission of pulses. Diodes may also be used to enable one set of relay contacts to perform multiple functions.

Figs. 7, 10 and 14 illustrate a third problem in which diodes are employed as isolating elements in the transfer connections between relays. This problems is essentially different from the problem of Figs. 1, 5 and 12.

In the problem of Fig. 14, events 1 and 6, but not 2, are necessary to cause the output event 10. These causal connections are indicated by arrows 192, 194 and 196 extending from rectangles 1, 6 and 2 to rectangle 10. A bracket 198 extends between the arrows 192 and 194 to indicate that these causal links are conjunctive. A dot 200 at the end of the arrow 196 indicates that this link is inhibitive. Corresponding arrows 192A, 194A and 196A appear in Fig. 10, which illustrates a problem disk 26C for this problem.

It will be seen from Fig. 14 that the events 3, 4, 5, 9 and 10 are A events, while events 1, 2, 6, 7 and 8 are B events. The relays corresponding to the A events are A relays, and the relays corresponding to the B events are B relays.

Events 3 and 5 act conjunctively to cause event 1. These connections are indicated by arrows 202 and 204 extending from the rectangles 3 and 5 to the rectangle 1 with a bracket 206 extending between the arrows. Event 5 also causes event 2, as indicated by an arrow 208. However, event 2 may be inhibited by event 9, as indicated by an arrow 210 and a dot 212.

Events 6 and 8 act conjunctively to cause event 9, as indicated by arrows 214 and 216 and a bracket 218.

Event 8 is caused by event 4, as indicated by an arrow 220. It will be seen that event 4 also causes event 7, as indicated by an arrow 222, and event 7 in turn causes event 3, as indicated by an arrow 224. Corresponding arrows 202A, 204A, 208A, 210A, 214A, 216A, 220A, 222A and 224A appear on the problem disk 26C of Fig. 10.

From the problem disk of Fig. 10, the subject may be able to draw a number of inferences. It will be apparent that a chain of direct causation extends from event 4 to event 7 and thence to event 3. Likewise, it will be apparent that direct causation exists between events 4 and 8. Other inferences can also be drawn after the subject has operated certain push buttons experimentally. Although the subject can determine all of the causal relations in the problem by operating the push buttons, he will usually be in a position to obtain the correct solution by a combination of experimentation and logical inference without being certain of every causal relation.

It will be apparent from Fig. 14 that the first step in the correct solution is to operate push button P4 during an A half cycle. This actuates lamps L7 and L8 during the following B half cycle. During this same B half cycle, the subject must actuate push button P6. This, in conjunction with the simultaneous actuation of lamp L8, actuates lamp L9 during the next A half cycle. Similarly, the actuation of lamp L3 is caused by the prior actuation of lamp L7.

During the second A half cycle, the subject must actuate push button P5. This, in conjunction with the simultaneous actuation of lamp L3 actuates lamp L1 during the following B half cycle. The actuation of push button P5 would also actuate lamp L2, were it not for the inhibiting effect of the actuation of lamp L9. Thus, the inhibiting effect of lamp L2 upon the output lamp L10 is avoided.

During the following B half cycle, the subject must again actuate push button P6. This, in conjunction with the simultaneous actuation of lamp L1, operates the output lamp L10 and completes the problem. Thus, during two complete cycles, beginning with an A half cycle, the subject actuates P4, P6, P5 and P6 to achieve the correct solution, P6 being actuated twice.

Fig. 7 illustrates the connections of a plug board 230 for setting up the third problem of Figs. 10 and 14. It will be seen that the push-button lines PL3, PL4, PL5 and PL9 of the relays R3, R4, R5 and R9 are connected to the push-button supply line PA, because these relays are A relays. Similarly, the push-button lines PL1, PL2, PL6, PL7 and PL8 are connected to the push-button supply line PB. In like manner, the off line OA is connected to the inhibition lines I3, I4, I5 and I9. The off line OB is connected to the inhibition lines I1, I2, I6, I7 and I8. It will be seen, however, that an isolating diode 232 is connected between the off line OB and the inhibition line I2. This is done because the inhibition line I2 is also used in establishing the inhibitive connection between the relays R9 and R1. Thus, the relay contacts C9B are connected between the inhibition supply line IB and the inhibition line I2. The diode 232 is polarized so as to permit the off pulses VOB to travel from the off line OB to the inhibition line I2, while preventing the inhibition pulses VIB from traveling from the inhibition line I2 to the off line OB. If the inhibition pulses were allowed to travel to the off line OB, all of the B relays would be inhibited by relay R9.

The conjunctive causal connection from relays R3 and R5 to relay R1 is established by connecting the relay contacts C3B and C5B in series between the transfer line TA–B and the actuating line A1. To establish the direct causal connection between relays R5 and R2, the relay contacts C5C are connected between the transfer line TA–B and the actuating line A2.

The direct causal connection between relays R7 and R3 is established by connecting the relay contacts C7B between the transfer line TB–A and the actuating line A3. However, a diode 234 is interposed between the transfer line TB–A and the contacts C7B. The conjunctive causal connection from relays R6 and R8 to relay R9 is established by connecting the relay contacts C6B and C8B in series between the transfer line TB–A and the actuating line A9. Here again, however, the diode 234 is interposed in this path. It will be apparent that this diode 234 obviates any possibility that the push-button pulses VPA might travel back from one of the actuating lines A3 or A9 to the transfer line TB–A and in turn to the actuating line A10 of relay R10 through relay contacts C1B and C6C, which are connected in series between the transfer line TB–A and the actuating line A10, to establish the conjunctive causal relation from relays R1 and R6 to the output relay R10. Such false routing of the push-button pulses might cause a spurious solution or might give the subject spurious information.

The remaining direct causal connections between relay R4 and relays R7 and R8 are established by connecting the relay contacts C4B and C4C between the transfer line TA–B and the actuating lines A7 and A8. Likewise, the remaining inhibitive connection between relays R2 and R10 is established by connecting the relay contacts C2B between the inhibition supply line IA and the inhibition line I10.

In the correct solution, the subject operates push button P4 during an A half-cycle. This actuates relay R4 and lamp L4. The operation is transferred to relays R7 and R8 and lamps L7 and L8 during the following B half-cycle, by the action of the transfer pulses traveling through the contacts C4B and C4C to the actuating lines A7 and A8.

During this B half-cycle, the subject presses the push button P6. This immediately actuates relay R6 and lamp L6. The conjunctive actuation of relays R6 and R8 causes the actuation of relay R9 during the next A half-cycle. Such actuation is caused by transmission of the transfer pulse VB–A through the diode 234 and the contacts C6B and C8B to the actuating line A9. Likewise, the operation of relay R7 is transferred to relay R3 by the transmission of the transfer pulse VB–A through the contact C7B.

During the second A half cycle, the subject operates the push button P5. This actuates the relay R5 and causes transfer to the relay R1 by the action of the transfer pulse VA–B through the relay contacts C3B and C5B. The actuation of the relay R9 causes the transmission of an inhibition pulse through the contact C9B to the inhibition line I2 and prevents the transfer from relay R5 to relay R2 that would otherwise be caused by the transfer pulse VA–B traveling through the relay contacts C5C.

During the second B half cycle, the subject again actuates the push button P6. This, together with the actuation of relay R1, routes the transfer pulse VB–A through the contacts C1B and C6C to the actuating line A10 to operate the output relay R10 and the output lamp L10.

It has already been indicated that inhibition may be accomplished by opening the actuating or holding circuits for the relays, rather than by closing circuits extending to the inhibition lines. Furthermore, it has been indicated that the time base may be simplified by employing the push-button supply pulses VPA and VPB to turn off as well as actuate the relays.

Fig. 11 is a circuit diagram of a modified psychological testing device illustrating these and other modifications. In this arrangement, the push-button pulses VPA and VPB of Fig. 15 are employed to accomplish all functions. As before, these pulses are derived with the aid of the cam 110 and the contacts 112, 114, and 116. However, the contact 112 is connected to the direct current power line LN1, while the contacts 114 and 116 are connected directly to B and A supply lines LNB and LNA. The time base lamps LA and LB are connected from the lines LNA and LNB to the return line LN2.

If manual control of the time base is desired, the contacts 112, 114 and 116 may be arranged for manual operation or may be replaced with a single pole double throw switch.

It will be seen that the push-button supply lines PL4, PL5, PL6 and PL7 for the A relays R4–7 are connected to the supply line LNA. The push-button supply lines PL1, PL2, P13 PL8 and PL9 for the B relays are connected to the supply line LNB.

In order that the alternate pulses on the lines LNA and LNB may be employed to turn off the relays, the holding contacts of the A relays R4–7 are connected to the line LNA, while the holding contacts of the B relays R1, R2, R3, R8 and R9 are connected to the line LNB. More specifically, the free or independent contact of the normally open pair on the triple contacts C4A is connected to the line LNA. Similar specific connections are made for the other relays.

Thus, any of the A relays may be actuated during the A half-cycle by pressing the corresponding push button. At the end of the A half-cycle, the actuated relay is turned off when the contact 112 disconnects the line LNA from the line LN1 and thereby terminates the supply pulse VPA. The action is similar for the B relays.

Transfers between relays are effected by connecting normally open contacts from the lines LNA and LNB to the actuating lines A1–10. In the arrangement of Fig. 11, the testing device 240 is set up for the same problem illustrated in Figs. 1, 5 and 12. Thus, the relay contacts C7B are connected between the line LNB and the actuating line A1. The contacts C5B and C6B are connected in parallel between the line LNB and the actuating line A2. The causal connection between the relays R5 and R3 is established by connecting the contacts C5C between the line LNB and the actuating line A3.

Contacts C8B and C9B are connected in series between the line LNA and the actuating line A7. It will be seen that the contacts C4B and C4C are connected from the supply line LNB to the actuating lines A8 and A9.

In the case of the output relay, inhibition by relay R3 is necessary to this particular problem. In this case, inhibition is accomplished by providing a pair of normally closed contacts C3F on relay R3. Actually, for the sake of flexibility all of the relays R1–9 are provided with normally closed as well as normally open contacts, the normally closed contacts being adapted to be employed as inhibition contacts. The normally closed contacts are shown as C1F–C9F in Fig. 11. All of them are unused except the contacts C3F. These contacts are connected in series with the contacts C1B and C2B between the line LNA and the actuating line A10. Thus, the output relay R10 will be actuated if the contacts C1B and C2B are closed while the contacts C3F remain closed.

The free holding contact of the triple set C10A is connected directly to the direct current power line LN1 through a normally closed push-button reset switch P10A. Thus, the output relay R10 remains actuated until the reset switch P10A is opened.

The eleventh relay R11 is not used in the problem illustrated in Fig. 11, but it may be used in the manner illustrated in Figs. 5, 9 and 13. Fig. 11 should be considered in connection with Fig. 4, which should be arranged above Fig. 11, in the same manner as the arrangement between Figs. 3 and 4 illustrated in Fig. 8.

It will be noted that the current limiting resistors ZR1–11 are omitted from the arrangement of Fig. 11. The return ends of the relay windings R1–11 are connected directly to the direct current power line LN2. This simplification is possible because the inhibition lines I1–11 of Fig. 3 are not used in the arrangement of Fig. 11.

Except as otherwise described, the arrangement of Figs. 11 and 4 may be the same as the arrangement of Figs. 2–7.

It will be apparent that the modified testing device 240 of Fig. 11 has the advantage of simplicity. However, it is necessary that the relays R1–9 be of the slow release type, or otherwise be slowed in their releasing action, so that the transfers between relays can occur before the transfer contacts are opened by the release of the relays. For example, consider the transfers from relay R4 to relays R8 and R9. The relay R4 is actuated during the A half-cycle by closing its push-button switch P4. The relay holds in by virtue of its holding contacts C4A. In this regard, it will be understood that all of the holding contacts are make-before-break contacts, as in the case of the arrangement of Figs. 1–7. The energization of the relay R4 closes the contacts C4B and C4C, but transfer to the relays R8 and R9 cannot occur until the beginning of the B half-cycle. Similarly, with the beginning of the B half-cycle, the relay R4 is de-energized. However, the contacts C4B and C4C remain closed for a sufficient interval to actuate the relays R8 and R9, due to the slow release characteristic of the relays.

The slow release characteristics of all of the relays R1-9 are made substantially the same so that the contacts of relays acting in conjunction will remain closed for similar intervals. Moreover, the normally closed inhibition contacts C1F-C9F are arranged to remain open until the transfer contacts C1B-C9D are opened. In this way, the inhibition contacts positively prevent transfers between associated transfer contacts.

In the first embodiment of Figs. 1-7, the relays need not be of the slow release type, and their release characteristics need not be closely matched. The inhibition pulses overlap the transfer pulses so that inhibition is positive. The transfer and inhibition pulses occur before the transferring relays are turned off by the off pulses. This obviates any need for relays with slow release characteristics. The holding lines of the relays are always energized, so that the transfer pulses are sure to effect the transfer operations in the appropriate cases.

It will be apparent that the psychological testing devices described and illustrated in the present application are admirably well adapted to accomplish the objects of the present invention. These devices make it readily possible to present a subject with numerous problems involving abstract causal relations. The behavior of the subject in solving the problems may readily be observed. In this way, the problem solving process may be analyzed critically. Moreover, the problem solving ability and technique of any given subject may be determined with accuracy and reproducibility.

Fact content, if desired, may be introduced into the problems in various ways, as by associating various pictures and legends with the indicators and actuators. The indicator lamps may be arranged to illuminate the pictures and legends. Facts may also be presented on the problem disks or other clue members.

For group testing or group instruction, the testing apparatus may be provided with two or more duplicate control panels and a remote display panel, large enough to be seen by the group. A duplicate set of the lamps or other indicators and a duplicate problem disk may be mounted on the remote panel. Each member of the group may be provided with a complete control panel, or a partial panel having a set of push buttons or other actuators and a problem disk.

Various other modifications, alternative constructions and equivalents may be employed without departing from the true spirit and scope of the present invention, as exemplified in the foregoing description and defined in the following claims.

We claim:

1. In a testing device, an output indicator element, a plurality of manually operable input actuator elements, input indicator elements directly operable by said input actuator elements, a plurality of manually operable intermediate actuator elements, a plurality of intermediate respondor elements directly operable by said intermediate actuator elements, a plurality of intermediate indicator elements operable by said intermediate respondor elements, means establishing a causal network between said input actuator elements and said output indicator element with said intermediate respondor elements in intermediate positions in said network, said network being operative to actuate said output indicator element in response to selective operation of said input elements.

2. In a testing device, output indicator means, manually operable input actuator means, input respondor means operable by said input actuator means, input indicator means operable by said input respondor means, intermediate responder means, intermediate actuator means for directly operating said intermediate respondor means, intermediate indicator means operable by said intermediate respondor means, means for establishing causal chain connections between said input respondor means and said output indicator means with said intermediate respondor means in at least some of said chain connections, said connections being operative to actuate said output indicator means in response to unique manipulation of said input actuator means.

3. In a psychological testing device, an output indicator, a plurality of manually operable input push buttons, input indicators directly operable by said input push buttons, a plurality of intermediate respondors, a plurality of intermediate indicators operable by said intermediate respondors, manually operable intermediate push buttons for directly operating said intermediate respondors, means for establishing a network of causal chain connections between said input push buttons and said output indicator with said intermediate respondors in at least some of said chain connections, said network being operative to actuate said output indicator in response to unique manipulation of said input push buttons.

4. In a psychological testing device, an output indicator, a plurality of manually operable input push buttons, input relays and input indicators directly operable by said input push buttons, a plurality of intermediate relays and indicators, manually operable intermediate push buttons for directly operating said intermediate relays and indicators, means for establishing a network of causal chain connections between said input relays and said output indicator with said intermediate relays in at least some of said chain connections, said network being operative to actuate said output indicator in response to unique manipulation of said input push buttons.

5. In a psychological testing device, an output indicator, a plurality of manually operable input actuators, input respondors and indicators directly operable by said input push buttons, a plurality of intermediate respondors and indicators, manually operable intermediate actuators for directly operating said intermediate respondors and indicators, means for establishing a network of direct, disjunctive, conjunctive and inhibitive causal connections between said input push buttons and said output indicator with said intermediate respondors in at least some of said connections, said network being operative to actuate said output indicator in response to unique manipulation of said input actuators.

6. In a testing device, a plurality of manually operable input push-button switches, input relays operable thereby, an output relay, manually operable intermediate push-button switches, intermediate relays operable thereby, input, intermediate and output lamps operable by said relays and arranged in a circular pattern with said output lamp centered therein, means establishing a plurality of causal connections among said relays whereby predetermined manipulation of said input switches will operate said output lamp, and a problem disk centered with respect to said circular pattern and bearing indicia giving clues as to said causal connections.

7. In a testing device, a plurality of manually operable input push-button switches, input relays operable thereby, an output relay, manually operable intermediate push-button switches, intermediate relays operable thereby, input, intermediate and output lamps operable by said relays and arranged in a circular pattern with said output lamp centered therein, means establishing a cyclical time base with first and second half-cycles, said lamps and corresponding relays and switches being assigned to first and second groups corresponding to said first and second half-cycles, means for energizing said switches of said first and second groups during said first and second half-cycles, said relays having holding means for holding in said relays, means for de-energizing said relays of said first and second groups during said second and first half-cycles, said relays having transfer contacts thereon, means connecting certain of said transfer contacts of certain of said relays in energizing causal connections to certain other of said relays, means connecting certain of said transfer contacts of certain of said relays in inhibitive causal connections to certain other of said relays, said output lamp thereby being operable by predetermined manipulations of said input switches, and a problem disk centered with respect to said circular pattern and bearing indicia giving clues as to said causal connections.

8. In a testing device, a plurality of manually operable input push-button switches, input relays operable thereby, an output relay, manually operable intermediate push-button switches, intermediate relays operable thereby, input, intermediate and output lamps operable by said relays and arranged in a circular pattern with said output lamp centered therein, means establishing a cyclical time base with first and second half-cycles, said lamps and corresponding relays and switches being assigned to first and second groups corresponding to said first and second half-cycles, a power supply having first and second power supply lines connected thereto, means for supplying first pulses from said lines for energizing said switches of said first and second groups during said first and second half-cycles, holding contacts on each of said relays and connected to the corresponding switch, said first line and one side of said relay for holding in said relay, actuating lines connected to said holding contacts, inhibition lines connected to the other sides of said relays, impedances connected between said inhibition lines and said second power supply line, means for supplying second pulses to said inhibition lines of said relays of said first and second groups for de-energizing said relays during major initial portions of said second and first half-cycles, said input and intermediate relays having normally open transfer contacts, means for supplying short transfer pulses during the remaining minor portions of said half-cycles, means connecting certain of said transfer contacts to route said transfer pulses to certain of said actuating lines for establishing active causal connections between certain relays, means for supplying inhibition pulses overlapping said transfer pulses in time, means connecting certain of said transfer contacts to route said inhibition pulses to certain of said inhibition lines for establishing inhibitive causal connections between certain relays, said causal connections involving said input, intermediate and output relays whereby said output lamp will be operated by predetermined manipulation of said input switches, and a problem disk mounted within said circular pattern and bearing arrows giving clues as to said causal connections.

9. In a testing device, a plurality of manually operable input push-button switches, input relays operable thereby, an output relay, manually operable intermediate push-button switches, intermediate relays operable thereby, input, intermediate and output lamps operable by said relays and arranged in a circular pattern with said output lamp centered therein, means establishing a cyclical time base with first and second half-cycles, said lamps and corresponding relays and switches being assigned to first and second groups corresponding to said first and second half-cycles, first and second branch lines connected to said switches of said first and second groups, means for energizing said branch lines alternately during said first and second half-cycles, said relays having holding contacts connected to said branch lines for holding in each of said relays during the corresponding half-cycle while de-energizing said relay during the other half-cycle, said relays having normally open transfer contacts and normally closed inhibition contacts, means connecting certain of said transfer contacts of certain of said relays in energizing causal connections from said branch lines to certain other of said relays, means connecting certain of said inhibition contacts of certain of said relays in inhibitive causal connections to certain other of said relays, said output lamp thereby being operable by predetermined manipulation of said input switches, and a problem disk positioned in centered relation to said circular pattern and bearing arrows giving clues as to said causal connections.

10. In a testing device, a plurality of manually operable input actuators, input respondors operable thereby, an output respondor, manually operable intermediate actuators, intermediate respondors operable thereby, input, intermediate and output signals operable by said respondors, means establishing a cyclical time base with first and second half cycles, said signals and corresponding respondors and actuators being assigned to first and second groups corresponding to said first and second half cycles, means for activating said actuators of said first and second groups during said first and second half cycles, said respondors having holding means for holding in said respondors, means for de-activating said respondors of said first and second groups during said second and first half cycles, said respondors including transfer means, means connecting certain of said transfer means of certain of said respondors in activating causal connections to certain other of said respondors, and means connecting certain of said transfer means of certain of said respondors in inhibitive causal connections to certain other of said respondors, said output signal thereby being operable by predetermined manipulations of said input actuators.

11. In a testing device, a plurality of manually operable input actuators, input respondors operable thereby, an output respondor, manually operable intermediate actuators, intermediate respondors operable thereby, input, intermediate and output signals operable by said respondors, means establishing a cyclical time base with first and second half cycles, said signals and corresponding respondors and actuators being assigned to first and second groups corresponding to said first and second half cycles, means for activating said actuators of said first and second groups during said first and second half cycles, said respondors having holding means for holding in said respondors, means for de-activating said respondors of said first and second groups during said second and first half cycles, said respondors including transfer means, and means connecting certain of said transfer means of certain of said respondors in activating causal connections to certain other of said respondors, said output signal thereby being operable by predetermined manipulations of said input actuators.

12. In a testing device, a plurality of manually operable input actuators, input respondors operable thereby, an output respondor, manually operable intermediate actuators, intermediate respondors operable thereby, input, intermediate and output signals operable by said respondors, means establishing a cyclical time base with first and second half cycles, said signals and corresponding respondors and actuators being assigned to first and second groups corresponding to said first and second half cycles, time base signal means for indicating the passage of said first and second half cycles, means for activating said actuators of said first and second groups during said first and second half cycles, said respondors having holding means for holding in said respondors, means for de-activating said respondors of said first and second groups during said second and first half cycles, said respondors including transfer means, and means connecting certain of said transfer means of certain of said respondors in activating causal connections to certain other of said respondors, said output signal thereby being operable by predetermined manipulations of said input actuators.

13. In a testing device, a plurality of manually operable input push-button switches, input relays operable thereby, an output relay, manually operable intermediate push-button switches, intermediate relays operable thereby, input, intermediate and output lamps operable by said relays, means establishing a cyclical time base with first and second half cycles, said lamps and corresponding relays and switches being assigned to first and second groups corresponding to said first and second half cycles, means for energizing said switches of said first and second groups during said first and second half cycles, said relays having holding means for holding in said relays, means for de-energizing said relays of said first and second groups during said second and first half cycles, said relays having transfer contacts thereon, means connecting certain of said transfer contacts of certain of said relays in energizing causal connections to certain other of said relays, and means connecting certain of said transfer contacts of certain of said relays in inhibitive causal connections to certain other of said relays, said output lamp thereby being operable by predetermined manipulations of said input switches.

14. In a testing device, a plurality of manually operable, input push-button switches, input relays operable thereby, an output relay, manually operable intermediate push-button switches, intermediate relays operable thereby, input, intermediate and output lamps operable by said relays, means establishing a cyclical time base with first and second half cycles, said lamps and corresponding relays and switches being assigned to first and second groups corresponding to said first and second half cycles, a power supply having first and second power supply lines connected thereto, means for supplying first pulses from said lines for energizing said switches of said first and second groups during said first and second half cycles, actuation and inhibition lines connected to opposite sides of said relays, holding contacts on said relays and connected to said actuation lines and said first supply line for holding in said relays, impedances connected between said inhibition lines and said second power supply line, means for supplying second pulses to said inhibition lines of said relays of said first and second groups for de-energizing said relays, said input and intermediate relays having normally open transfer contacts, means for supplying transfer pulses during said half cycles, means connecting certain of said transfer contacts to route said transfer pulses to certain of said actuation lines for establishing active causal connections between certain relays, means for supplying inhibition pulses overlapping said transfer pulses in time, and means connecting certain of said transfer contacts to route said inhibition pulses to certain of said inhibition lines for establishing inhibitive casual connections between certain relays, said causal connections involving said input, intermediate and output relays whereby said output lamp will be operated by predetermined manipulation of said input switches.

15. In a testing device, a plurality of manually operable input push-button switches, input relays operable thereby, an output relay, manually operable intermediate push-button switches, intermediate relays operable thereby, input, intermediate and output lamps operable by said relays and arranged in a circular pattern with said output lamp centered therein, means establishing a cyclical time base with first and second half cycles, said lamps and corresponding relays and switches being assigned to first and second groups corresponding to said first and second half cycles, means for supplying first pulses for energizing said switches of said first and second groups during said first and second half cycles, holding means on said relays for holding in said relays, actuation and inhibition lines connected to said relays, means for supplying second pulses to said inhibition lines of said relays of said first and second groups for de-energizing said relays during major initial portions of said second and first half cycles, said input and intermediate relays having normally open transfer contacts, means for supplying short transfer pulses during the remaining minor portions of said half cycles, means connecting certain of said transfer contacts to route said transfer pulses to certain of said actuation lines for establishing active causal connections between certain relays, means for supplying inhibition pulses overlapping said transfer pulses in time, and means connecting certain of said transfer contacts to route said inhibition pulses to certain of said inhibition lines for esablishing inhibitive causal connections between certain relays, said causal connections involving said input, intermediate and output relays whereby said output lamp will be operated by predetermined manipulation of said input switches.

16. In a testing device, a plurality of manually operable input push-button switches, input relays operable thereby, an output relay, manually operable intermediate push-button switches, intermediate relays operable thereby, input, intermediate and output lamps operable by said relays, means establishing a cyclical time base with first and second half cycles, said lamps and corresponding relays and switches being assigned to first and second groups corresponding to said first and second half cycles, first and second branch lines connected to said switches of said first and second groups, means for energizing said branch lines alternately during said first and second half cycles, said relays having holding contacts connected to said branch lines for holding in each of said relays during the corresponding half cycle while de-energizing said relay during the other half cycle, said relays having normally open transfer contacts and normally closed inhibition contacts, means connecting certain of said transfer contacts of certain of said relays in energizing causal connections from said branch lines to certain other of said relays, and means connecting certain of said inhibition contacts of certain of said relays in inhibitive causal connections to certain other of said relays, said output lamp thereby being operable by predetermined manipulation of said input switches.

17. In a testing device, a plurality of manually operable input push-button switches, input relays operable thereby, an output relay manually operable intermediate push-button switches, intermediate relays operable thereby, input, intermediate and output lamps operable by said relays, means establishing a cyclical time base with first and second half cycles, said lamps and corresponding relays and switches being assigned to first and second groups corresponding to said first and second half cycles, first and second branch lines connected to said switches of said first and second groups, means for energizing said branch lines alternately during said first and second half cycles, said relays having holding contacts connected to said branch lines for holding in each of said relays during the corresponding half cycle while deenergizing said relay during the other half cycle, said relays having transfer contacts, and means connecting certain of said transfer contacts of certain of said relays in energizing causal connections from said branch lines to certain other of said relays, said output lamp thereby being operable by predetermined manipulation of said input switches.

18. In a testing device, a plurality of manually operable input actuators, plural-state input respondors operable between states thereby, a plural-state output respondor, manually operable intermediate actuators, plural-state intermediate respondors operable thereby, input, intermediate and output signals operable by said respondors, means establishing a cyclical time base with plural-part cycles, said signals and corresponding respondors and actuators being assigned to plural groups corresponding to said plural parts, means for activating said actuators of said groups during the corresponding parts, said respondors having memory means for detaining said respondors in any of said plural states, said respondors including transfer means, means connecting certain of said transfer means of certain of said respondors in state-changing causal connections to certain other of said respondors, and means connecting certain of said transfer means of certain of said respondors in state-change-inhibiting causal connections to certain other of said respondors, said output signal thereby being operable by predetermined manipulations of said input actuators.

19. In a testing device, a plurality of manually operable input actuators, plural-state input respondors operable thereby, a plural-state output respondor, manually operable intermediate actuators, plural-state intermediate respondors operable thereby, input, intermediate and output signals operable by said respondors, said respondors having memory means for detaining said respondors in any of said plural states, said respondors including transfer means, means connecting certain of said transfer means of certain of said respondors in state-changing causal connections to certain other of said respondors, said output signal thereby being operable by predetermined sequential state changes of said respondors induced by predetermined manipulations of said input actuators, and means for spreading out said sequential state changes in time.

References Cited in the file of this patent

UNITED STATES PATENTS

| | | |
|---|---|---|
| 2,269,444 | Durham et al. | Jan. 13, 1942 |
| 2,273,091 | De Silva | Feb. 17, 1942 |
| 2,609,618 | Chapple | Sept. 9, 1952 |

OTHER REFERENCES

"Proceedings of the I.R.E.," vol. 41, No. 10, October, 1953. "Computers and Automata" by Shannon, pp. 1234–1241.

"Arithmetical Operations in Digital Computers," (Richards), published by Nostrand (Princeton), 1955.